(12) United States Patent
Tsukadaira

(10) Patent No.: US 12,228,421 B2
(45) Date of Patent: Feb. 18, 2025

(54) MAP UPDATE DEVICE AND STORAGE MEDIUM

(71) Applicant: DENSO CORPORATION, Kariya (JP)

(72) Inventor: Masashi Tsukadaira, Kariya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 17/934,510

(22) Filed: Sep. 22, 2022

(65) Prior Publication Data

US 2023/0039735 A1 Feb. 9, 2023

Related U.S. Application Data

(63) Continuation of application No. PCT/JP2021/007690, filed on Mar. 1, 2021.

(30) Foreign Application Priority Data

Mar. 25, 2020 (JP) ................................ 2020-054172

(51) Int. Cl.
*G01C 21/00* (2006.01)

(52) U.S. Cl.
CPC ..... *G01C 21/3822* (2020.08); *G01C 21/3841* (2020.08); *G01C 21/387* (2020.08)

(58) Field of Classification Search
CPC ............ G01C 21/3822; G01C 21/3841; G01C 21/387
See application file for complete search history.

(56) References Cited

U.S. PATENT DOCUMENTS

| 2008/0262721 | A1 | 10/2008 | Guo et al. |
| 2017/0122748 | A1* | 5/2017 | Theodosis .......... G01C 21/3841 |
| 2020/0225044 | A1* | 7/2020 | Tohriyama ......... G01C 21/3848 |
| 2020/0302639 | A1* | 9/2020 | Park ....................... G06T 7/246 |

(Continued)

FOREIGN PATENT DOCUMENTS

| DE | 102018210681 A1 * | 1/2020 |
| JP | 2002-341757 A | 11/2002 |

(Continued)

OTHER PUBLICATIONS

Machine translation of DE 102018210681 A1 (Year: 2018).*

(Continued)

*Primary Examiner* — Hussein Elchanti
*Assistant Examiner* — Kenneth M Dunne
(74) *Attorney, Agent, or Firm* — Maschoff Brennan

(57) ABSTRACT

A server includes a feature point position estimation section that estimates positions of feature points of a plurality of respective input maps if a position correction section has failed in position correction for an input map, an accumulated data generation section that accumulates the positions of the feature points of the plurality of respective input maps to generate accumulated data, a convergence determination section that determines whether the positions of the feature points have converged based on the accumulated data, a difference data generation section that generates, if it is determined that the positions of the feature points have converged, difference data from the positions of the feature points that have converged, and a difference data reflection section that reflects the difference data in the reference map to update the reference map.

8 Claims, 22 Drawing Sheets

(56) References Cited

U.S. PATENT DOCUMENTS

2020/0400441 A1\* 12/2020 Efland ................ G01C 21/387
2022/0089183 A1\* 3/2022 Hwu ..................... G06N 3/088
2022/0316895 A1\* 10/2022 Kashu ................ G01C 21/3492

FOREIGN PATENT DOCUMENTS

| JP | 2008-051612 A | 3/2008 | | |
|---|---|---|---|---|
| JP | 2019-158701 A | 9/2019 | | |
| WO | WO-2018015811 A1 | \* | 1/2018 | ............. G01C 21/28 |

OTHER PUBLICATIONS

Sato et al., "An Traffic Signal Estimation on a Raid Map Survey System using GPS Trajectories as Collective Inteligence", The 20th Distributed Processing System Workshop (Proceedings of DPSWS2012) Symposium series of Information Processing Society of Japan, vol. 2012, No. 4, [CD-ROM], ISSN 1882-0840, Oct. 10, 2012, pp. 242-248.

\* cited by examiner

MAP UPDATE DEVICE AND STORAGE MEDIUM

CROSS-REFERENCE TO RELATED APPLICATION

The present application is based on and claims the benefit of priority from earlier Japanese Patent Application No. 2020-54172 filed Mar. 25, 2020, the description of which is incorporated herein by reference.

BACKGROUND

Technical Field

The present disclosure relates to a map update device and a storage medium.

Related Art

A map update device has been provided which acquires probe data from a vehicle and updates a reference map based on the acquired probe data.

SUMMARY

As an aspect of the present disclosure, a map update device is provided which includes: an input map generation section that generates an input map including a landmark and a lane marking based on a plurality of probe data including image data acquired from an in-vehicle camera and data acquired from at least one of an in-vehicle sensor and in-vehicle equipment; a position correction section that superimposes the input map and a reference map on each other based on a feature point to perform position correction for the input map; a difference detection section that detects a difference between the input map and the reference map if the position correction section has succeeded in the position correction for the input map; and a difference reflection section that reflects the difference detected by the difference detection section in the reference map to update the reference map.

The map update device includes: a feature point position estimation section that estimates positions of feature points of a plurality of respective input maps if the position correction section has failed in the position correction for the input map; an accumulated data generation section that accumulates the positions of the feature points of the plurality of respective input maps estimated by the feature point position estimation section to generate accumulated data; a convergence determination section that determines whether the positions of the feature points have converged based on the accumulated data generated by the accumulated data generation section; a difference data generation section that generates, if the convergence determination section determines that the positions of the feature points have converged, difference data from the positions of the feature points that have converged; and a difference data reflection section that reflects the difference data generated by the difference data generation section in the reference map to update the reference map.

DETAILED DESCRIPTION OF THE PREFERRED EMBODIMENTS

A map update device has been provided which acquires probe data from a vehicle and updates a reference map based on the acquired probe data. Specifically, the device generates an input map including position information on feature points such as a lane and a landmark and superimpose the generated input map on the reference map based on the feature points to perform position correction for the input map. Then, the device detects a difference between the input map and the reference map and reflects the detected difference in the reference map to update the reference map. When the reference map is updated, it is desirable to increase the accuracy of the reference map. For example, JP 2002-341757 A discloses a method that sets three feature points common to a plurality of maps and corrects a triangle formed from the set three feature points to increase the accuracy of the map.

The method of JP 2002-341757 A assumes that all of the plurality of superimposed maps have feature points. Hence, if both of the input map and the reference map have the feature points, the difference between the input map and the reference map can be detected, whereby the detected difference can be reflected in the reference map to update the reference map.

However, if the reference map is, for example, a map generated by surveying a site by a map supplier or a map before update with the latest probe data, and the data on the site has not been updated due to a newly-opened road or the like, although the input map generated from the probe data includes feature points, the reference map may not include the feature points. In this case, the difference between the input map and the reference map cannot be detected, whereby the reference map cannot be updated.

It is an object of the present disclosure to, in a configuration in which a difference between an input map and a reference map is detected to update the reference map, appropriately update the reference map.

Figure 1:
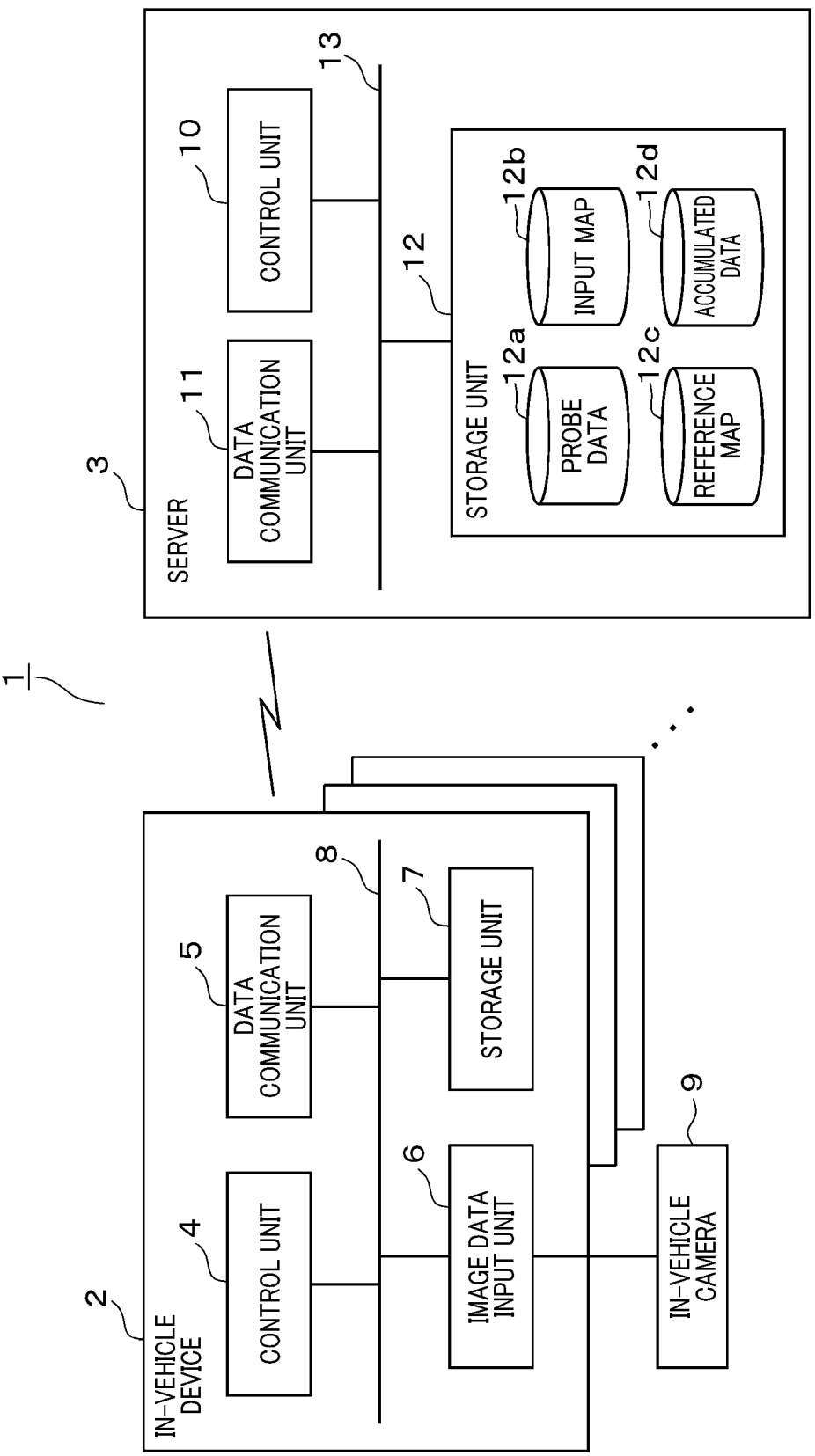
FIG. 1 is a functional block diagram illustrating an overall configuration of a map update device according to an embodiment.

Hereinafter, an embodiment will be described with reference to the drawings. As illustrated in FIG. 1, a map update system 1 is configured so that an in-vehicle device 2 installed on the vehicle side and a server 3 disposed on the network side can communicate with each other. A plurality of in-vehicle devices 2 are provided, whereas one server 3 is provided. The server 3 can perform data communication with the plurality of in-vehicle devices 2. The server 3 corresponds to a map update device.

The in-vehicle device 2 includes a control unit 4, a data communication unit 5, an image data input unit 6, and a storage unit 7, and is configured so that the functional blocks can perform data communication with each other via an internal bus 8. The control unit 4 is configured by a microcomputer having a CPU (Central Processing Unit), a ROM (Read Only Memory), a RAM (Random Access Memory), and an I/O (Input/Output). The microcomputer executes a computer program stored in a non-transitory tangible storage medium (the ROM) to perform a process corresponding to the computer program, thereby controlling overall operation of the in-vehicle device 2.

The data communication unit 5 controls data communication with the server 3. An in-vehicle camera 9 is separated from the in-vehicle device 2 and takes an image of an area in front of the vehicle to output the captured image data to the in-vehicle device 2. When receiving the image data from the in-vehicle camera 9, the image data input unit 6 outputs the received image data to the control unit 4. The control unit 4 stores information on a vehicle position determined by using a GPS signal received by a GPS (Global Positioning System) receiver, information on the time at which the vehicle position is determined, data acquired from the image data captured from the in-vehicle camera 9, data acquired from other in-vehicle sensor and in-vehicle equipment, and the like in the storage unit 7 as probe data. The probe data may include a position and features of a lane marking painted on a road, a sign placed on the road, and a landmark such as a signboard, which are recognized from the image data acquired from the in-vehicle camera 9. In addition, the probe data may include various pieces of information such as a shape, features, a width of a road and the like and a positional relationship.

The control unit 4 reads probe data from the storage unit 7, for example, every time a predetermined time period elapses or every time a travel distance of the vehicle reaches a predetermined distance, and causes the data communication unit 5 to transmit the read probe data to the server 3. Alternatively, when receiving a request from the server 3, the control unit 4 may read the prove data corresponding to the requested area or segment from the storage unit 7 to cause the data communication unit 5 to transmit the probe data to the server 3. The segment is a predetermined unit in which a road or an area is divided in order to manage the map. That is, the control unit 4 may cause the data communication unit 5 to transmit the probe data in units of segment to the server 3, or may cause the data communication unit 5 to transmit the probe data in units of other than segment to the server 3. Although the present embodiment illustrates a case in which probe data is generated based on image data captured by the in-vehicle camera 9, the probe data may be generated from survey data acquired by measuring equipment other than the in-vehicle camera 9. The measuring equipment other than the in-vehicle camera 9 is, for example, a millimeter-wave radar or a LiDAR (Light Detection and Ranging, Laser Imaging Detection and Ranging). Image data and survey data may be used together to generate probe data from the image data and the survey data.

The server 3 includes a control unit 10, a data communication unit 11, and a storage unit 12, and is configured so that the functional blocks can perform data communication with each other via an internal bus 13. The control unit 10 is configured by a microcomputer having a CPU, a ROM, a RAM, and an I/O. The microcomputer executes a computer program stored in a non-transitory tangible storage medium (ROM) to perform a process corresponding to the computer program, thereby controlling overall operation of the server 3. The computer program executed by the microcomputer includes a map update program.

The data communication unit 11 controls data communication with the in-vehicle device 2. The storage unit 12 includes a probe data storage section 12a storing probe data, an input map storage section 12b storing an input map, a reference map storage section 12c storing a reference map, and an accumulated data storage section 12d storing accumulated data. The input map is generated by an input map generation section 10a described later based on probe data. The reference map is a map generated by surveying a site by a map supplier, a map before update with the latest probe data, or the like. That is, if the data on the site has not been updated due to a newly-opened road or the like, although the input map generated from the probe data includes a landmark and a lane marking, the reference map corresponding to the side does not include the landmark and the lane marking.

If the data communication unit 11 receives probe data from the in-vehicle device 2, the control unit 10 stores the received probe data in the probe data storage section 12a. That is, since a plurality of in-vehicle devices 2 are provided and one server 3 is provided, the control unit 10 stores a plurality of probe data received from the plurality of in-vehicle devices 2 in the probe data storage section 12a.

Figure 2:
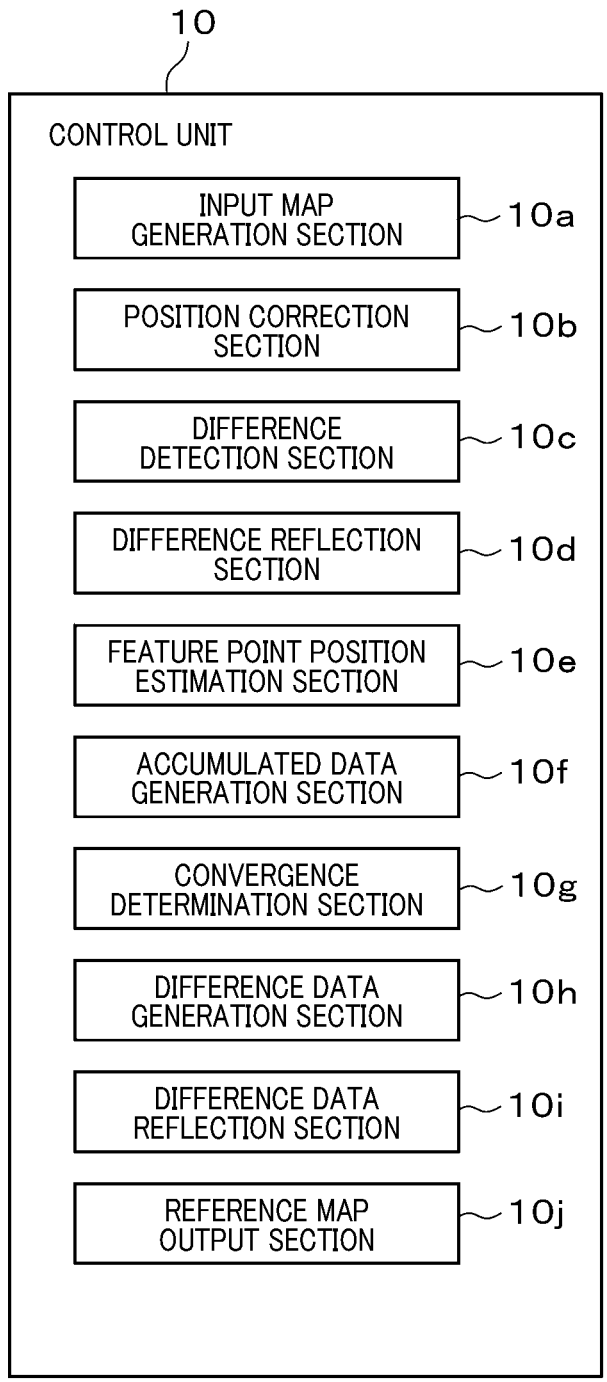
FIG. 2 is a functional block diagram of a control unit in a server.

As illustrated in FIG. 2, the control unit 10 includes the input map generation section 10a, a position correction section 10b, a difference detection section 10c, a difference reflection section 10d, a feature point position estimation section 10e, an accumulated data generation section 10f, a convergence determination section 10g, a difference data generation section 10h, a difference data reflection section 10i, and a reference map output section 10j. These functional blocks correspond to a process of the map update program performed by the microcomputer.

The input map generation section 10*a* generates an input map based on probe data stored in the probe data storage section 12*a* as below. The input map generation section 10*a* reads a plurality of probe data included in a segment, which is targeted for generation, stored in the probe data storage section 12*a*. In this case, if the probe data transmitted from the in-vehicle device 2 is in units of segment, the input map generation section 10*a* reads the plurality of probe data stored in the probe data storage section 12*a* without change, to acquire the probe data corresponding to the segment targeted for generation. If the probe data transmitted from the server 3 is not in units of segment, the input map generation section 10*a* reads the plurality of probe data included in the segment targeted for generation stored in the probe data storage section 12*a* to acquire the probe data corresponding to the segment targeted for generation. In this case, the plurality of probe data may be probe data transmitted from a different in-vehicle device 2 or probe data transmitted from the same vehicle with a time difference.

Considering that there is a landmark that cannot be set as a common landmark when accumulated data described later is generated, it is desirable that the input map generation section 10*a* acquires a segment including landmarks as much as possible. That is, the input map generation section 10*a* may compare the number of landmarks included in segments with a predetermined number, to acquire a segment including landmarks, the number of which is the predetermined number or more, but not to acquire a segment not including landmarks, the number of which is the predetermined number or more. The input map generation section 10*a* may determine accuracy in detecting a landmark, to acquire a segment including landmarks which have a detection level equal to or more than a predetermined level and the number of which is the predetermined number or more but not to acquire a segment not including landmarks which have a detection level equal to or more than the predetermined level and the number of which is the predetermined number or more.

The predetermined number and the predetermined level may be fixed values or variable values determined depending on, for example, a traveling position or a traveling environment of the vehicle. When the vehicle is traveling in an area in which the number of landmarks is relatively small, if the predetermined number is set to be large, the number of segments that may be acquired may be too small. Hence, it is desirable to set the predetermined number to be small. In contrast, when the vehicle is traveling in an area in which the number of landmarks is relatively large, if the predetermined number is set to be small, the number of segments that may be acquired may be too large. Hence, it is desirable to set the predetermined number to be large. Similarly, under a relatively bad detection environment due to, for example, influence of the weather, if the predetermined level is set to be high, the number of segments that may be acquired may be too small. Hence, it is desirable to set the predetermined level to be low. In contrast, under a relatively good detection environment, if the predetermined level is set to be low, the number of segments that may be acquired may be too large. Hence, it is desirable to set the predetermined level to be high.

Figure 3:
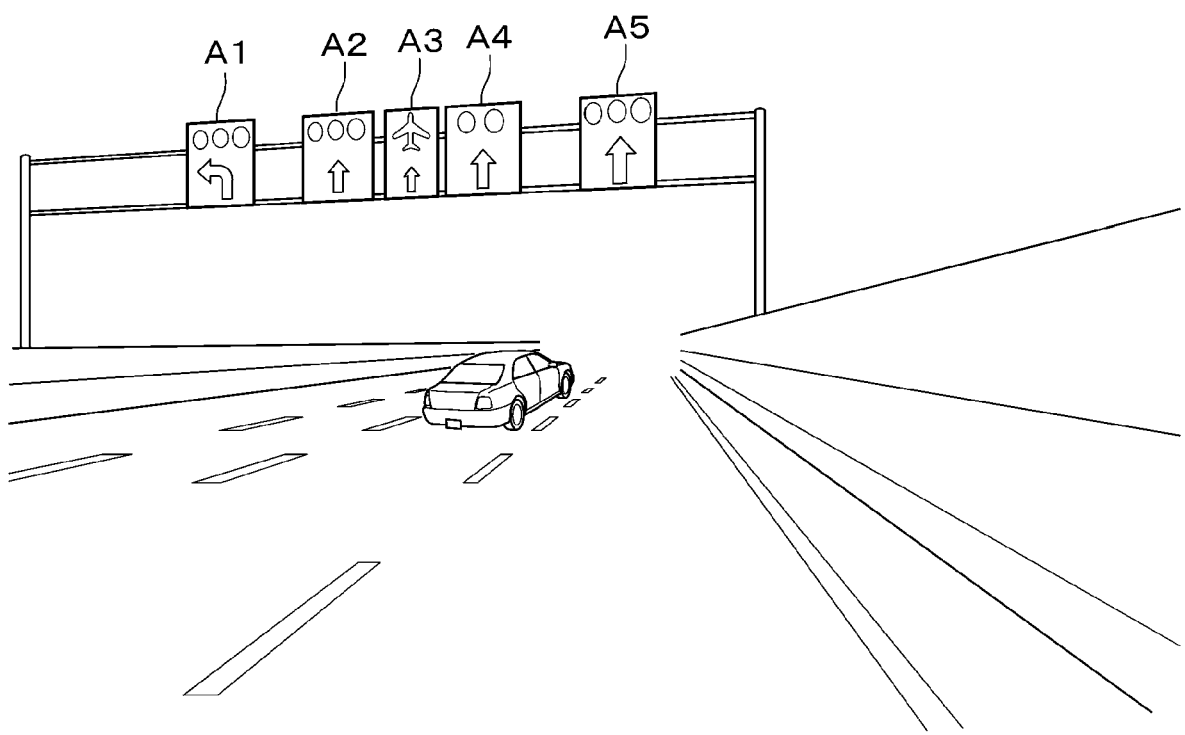
FIG. 3 is a diagram illustrating a mode in which signs are arranged above a road.
Figure 4:
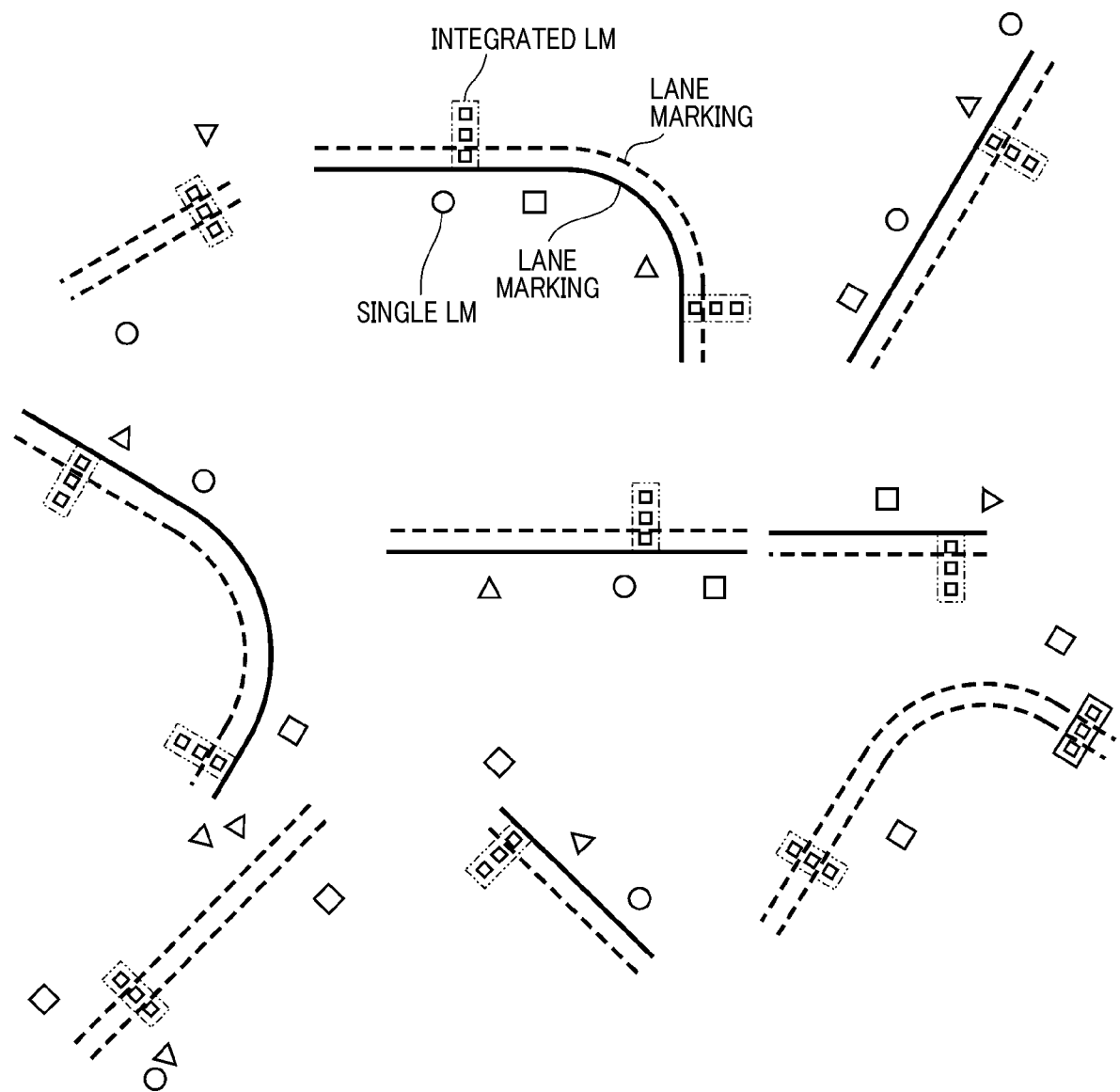
FIG. 4 is a diagram illustrating a mode of generating an input map (Part 1)

When a segment is acquired, if a plurality of landmarks are densely arranged or shapes of the landmarks are similar to each other in the acquired segment, the input map generation section 10*a* integrates the plurality of landmarks to set an integrated landmark. Specifically, as illustrated in FIG. 3, for example, when a plurality of signs A1 to A5 having similar shapes are densely arranged above a road, the input map generation section 10*a* integrates landmarks of the arranged signs A1 to A5 to set an integrated landmark as illustrated in FIG. 4. That is, the input map generation section 10*a* processes a plurality of landmarks, which are densely arranged or have similar shapes, as an integrated landmark, and processes a plurality of landmarks, which are dispersedly arranged or do not have similar shapes, as a single landmark. In FIG. 4 and the like, a landmark is denoted by LM.

Figure 5:
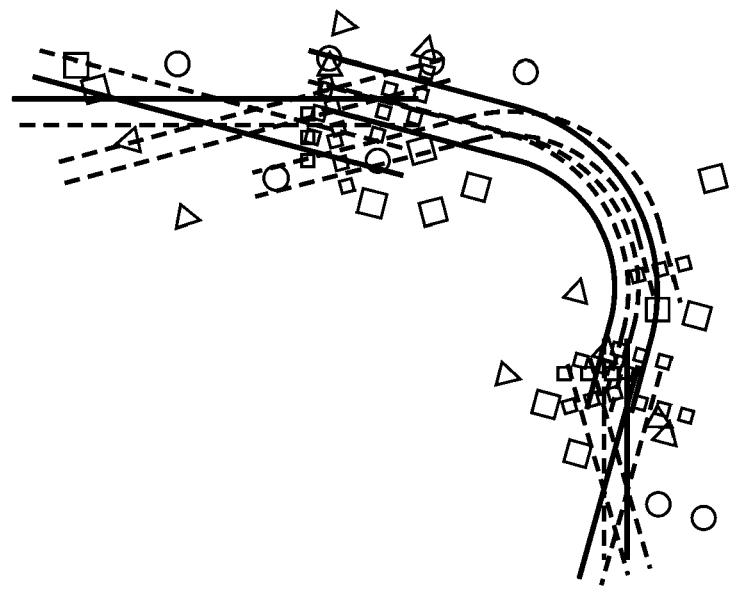
FIG. 5 is a diagram illustrating a mode of generating an input map (Part 2)
Figure 6:
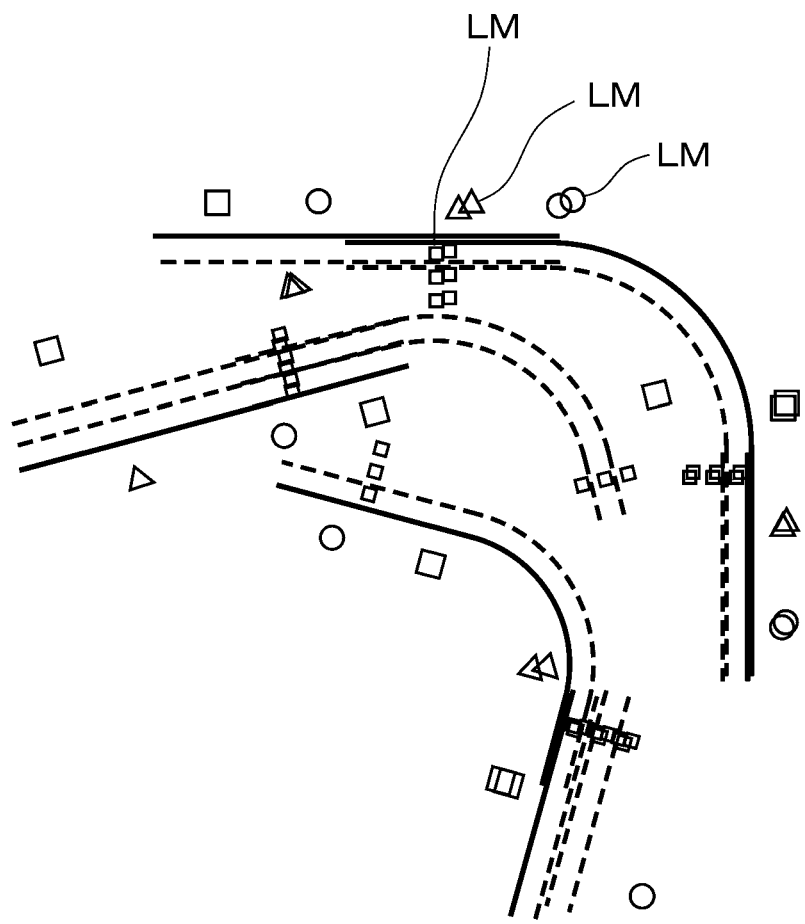
FIG. 6 is a diagram illustrating a mode of generating an input map (Part 3)

The input map generation section 10*a* corrects the position of the segment according to GPS coordinates of both ends of the segment, and determines, as illustrated in FIG. 5, an overlap of positions of the corrected segments. If determining that a plurality of segments whose GPS coordinates of both ends thereof agree with each other are present, the input map generation section 10*a* determines that the plurality of segments overlap with each other, and sets, as illustrated in FIG. 6, a landmark common to another segment in the segment for which the overlap is determined.

Figure 7:
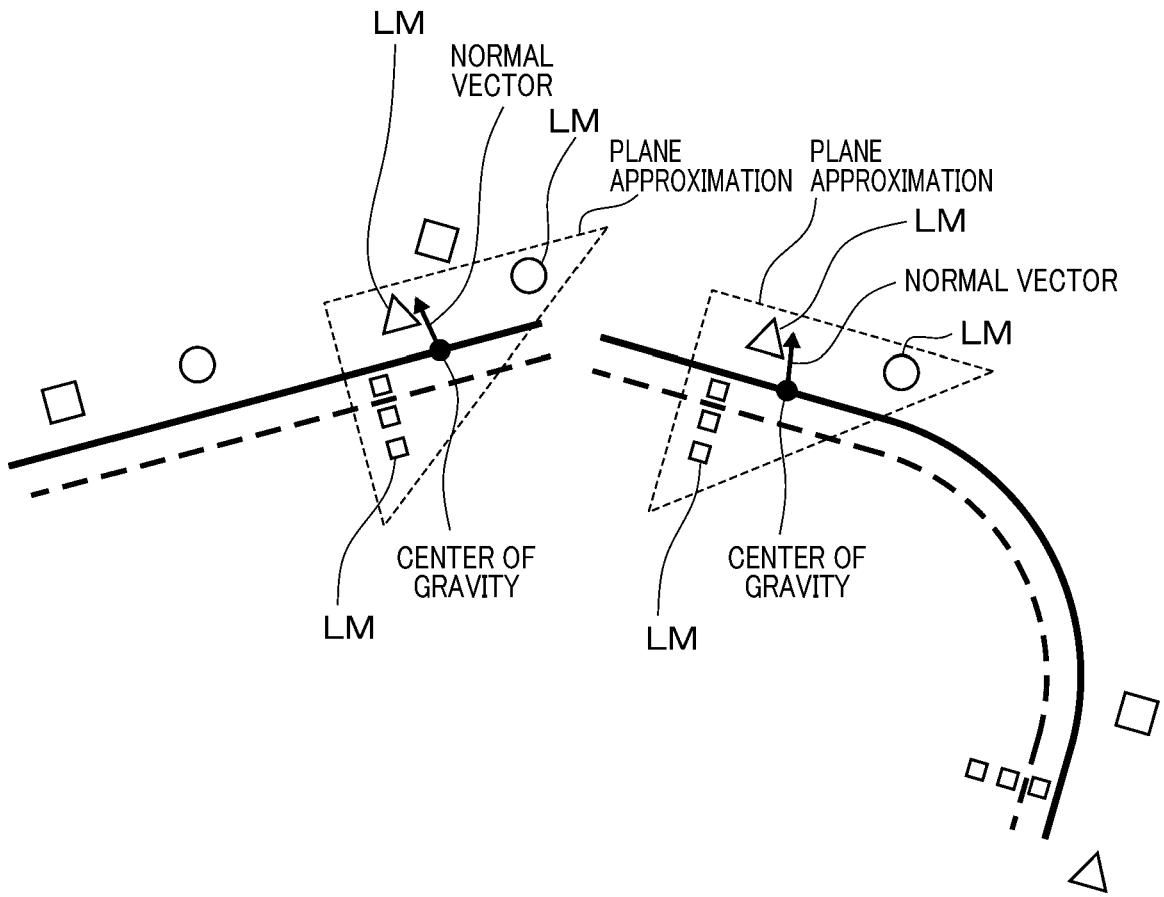
FIG. 7 is a diagram illustrating a mode of generating an input map (Part 4)
Figure 8:
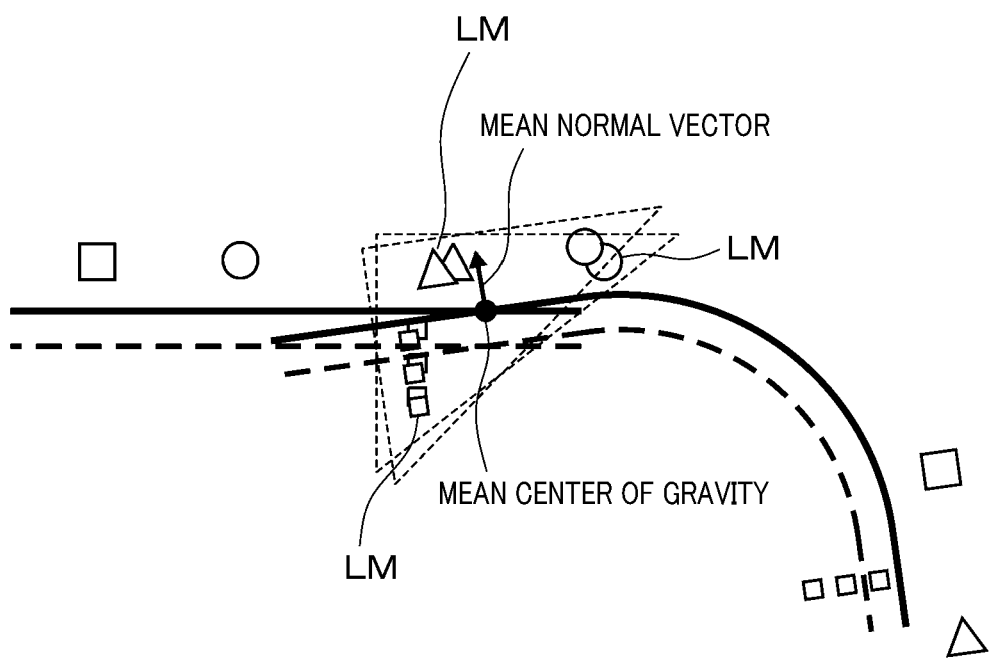
FIG. 8 is a diagram illustrating a mode of generating an input map (Part 5)
Figure 9:
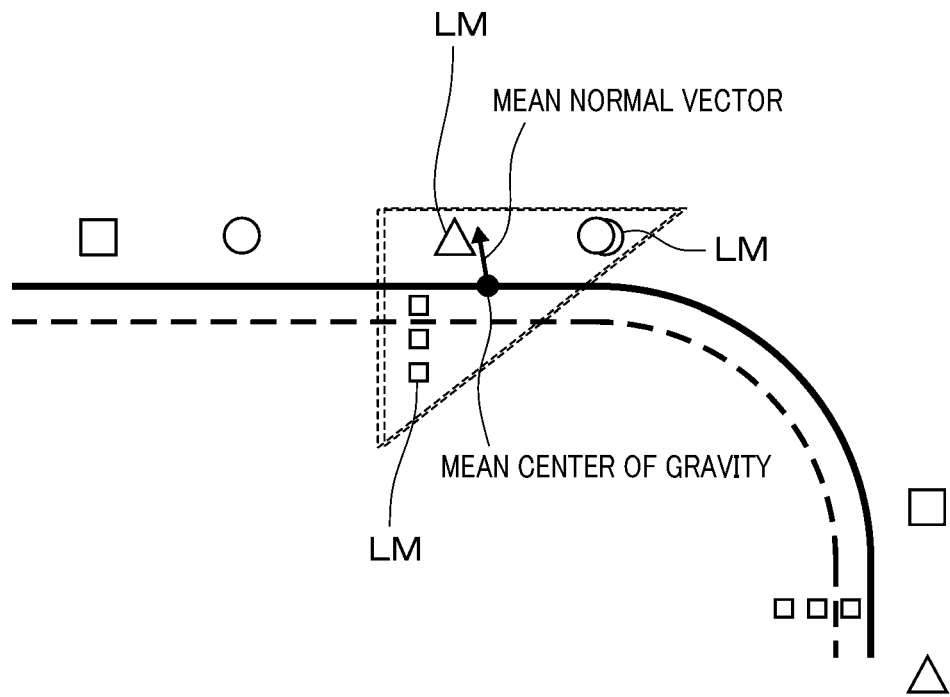
FIG. 9 is a diagram illustrating a mode of generating an input map (Part 6)

On setting the landmark common to another segment, the input map generation section 10*a* corrects the orientation of the segment according to the position of the set landmark. Specifically, as illustrated in FIG. 7, the input map generation section 10*a* calculates centers of gravity of the landmarks to perform plane approximation, calculates normal vectors with respect to the planes, calculates an average of the centers of gravity as an average center of gravity, and calculates an average of the normal vectors as an average normal vector. On calculating the average normal vector, as illustrated in FIG. 8, the input map generation section 10*a* translates the segment with respect to the average center of gravity, and, as illustrated in FIG. 9, rotates the segment around the average normal vector so that the sum of squares of errors of the landmarks is minimized, thereby correcting the orientation of the segment.

Figure 10:
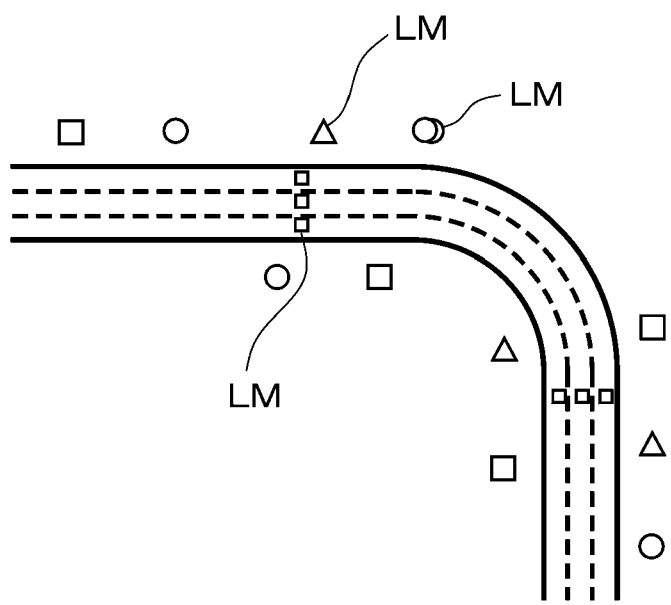
FIG. 10 is a diagram illustrating a mode of generating an input map (Part 7)
Figure 11:
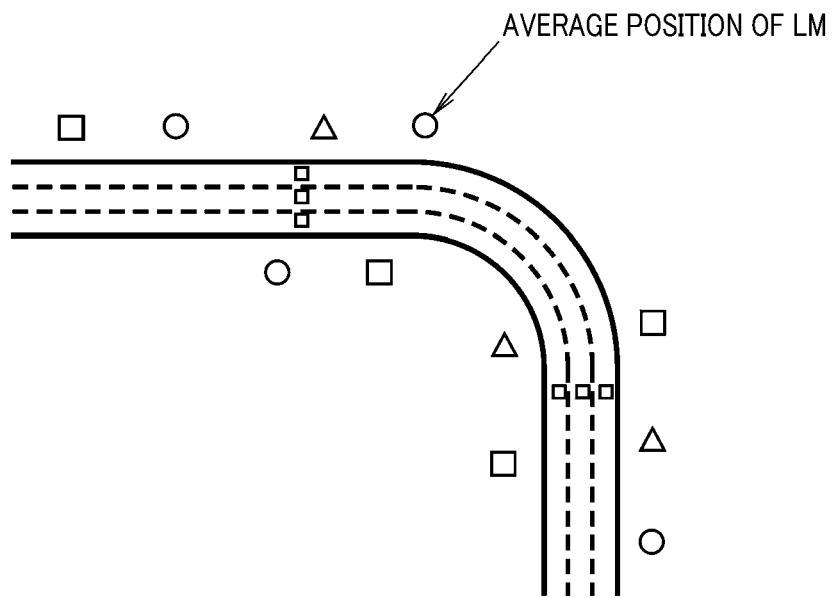
FIG. 11 is a diagram illustrating a mode of generating an input map (Part 8)

On correcting the orientation of the segment, as illustrated in FIG. 10 and FIG. 11, the input map generation section 10*a* averages the positions of the landmark in the segment whose orientation has been corrected to correct the size of the segment according to the averaged position of the landmark. On averaging the positions of the landmark and correcting the size of the segment, the input map generation section 10*a* corrects linear strain of the segment according to the averaged position of the landmark.

Figure 12:
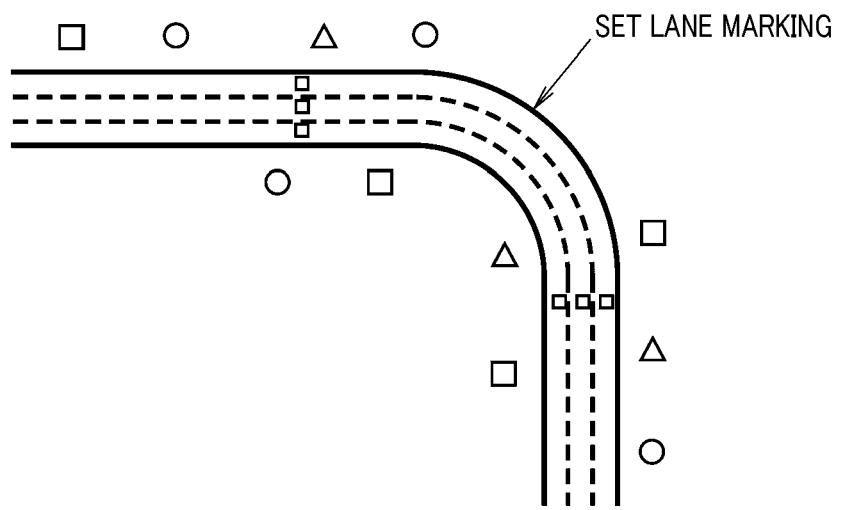
FIG. 12 is a diagram illustrating a mode of generating an input map (Part 9)

On correcting the linear strain of the segment, as illustrated in FIG. 12, the input map generation section 10*a* sets lane markings in the segment whose size and linear strain have been corrected to generate an input map including the set lane markings. On generating the input map, the input map generation section 10*a* causes the input map storage section 12*b* to store the generated input map. The input map generated by the input map generation section 10*a* includes landmarks and lane markings. The lane marking is expressed by a group of points, a three-dimensional polynomial expression, or a predetermined road model.

The position correction section 10*b* reads an input map stored in the input map storage section 12*b*, reads a reference map stored in the reference map storage section 12*c*, and superimposes the read input map and reference map on each other based on the landmarks to perform position correction for the input map. In this case, if the reference map includes the landmarks and the amount of information on the landmark is sufficient, the position correction section 10*b* succeeds in the position correction for the input map. Hereinafter, a case in which the position correction for the input map succeeds will be described with reference to FIG. 13 to FIG. 15. In FIG. 4 and the like, a lane marking is denoted by L.

Figure 13:
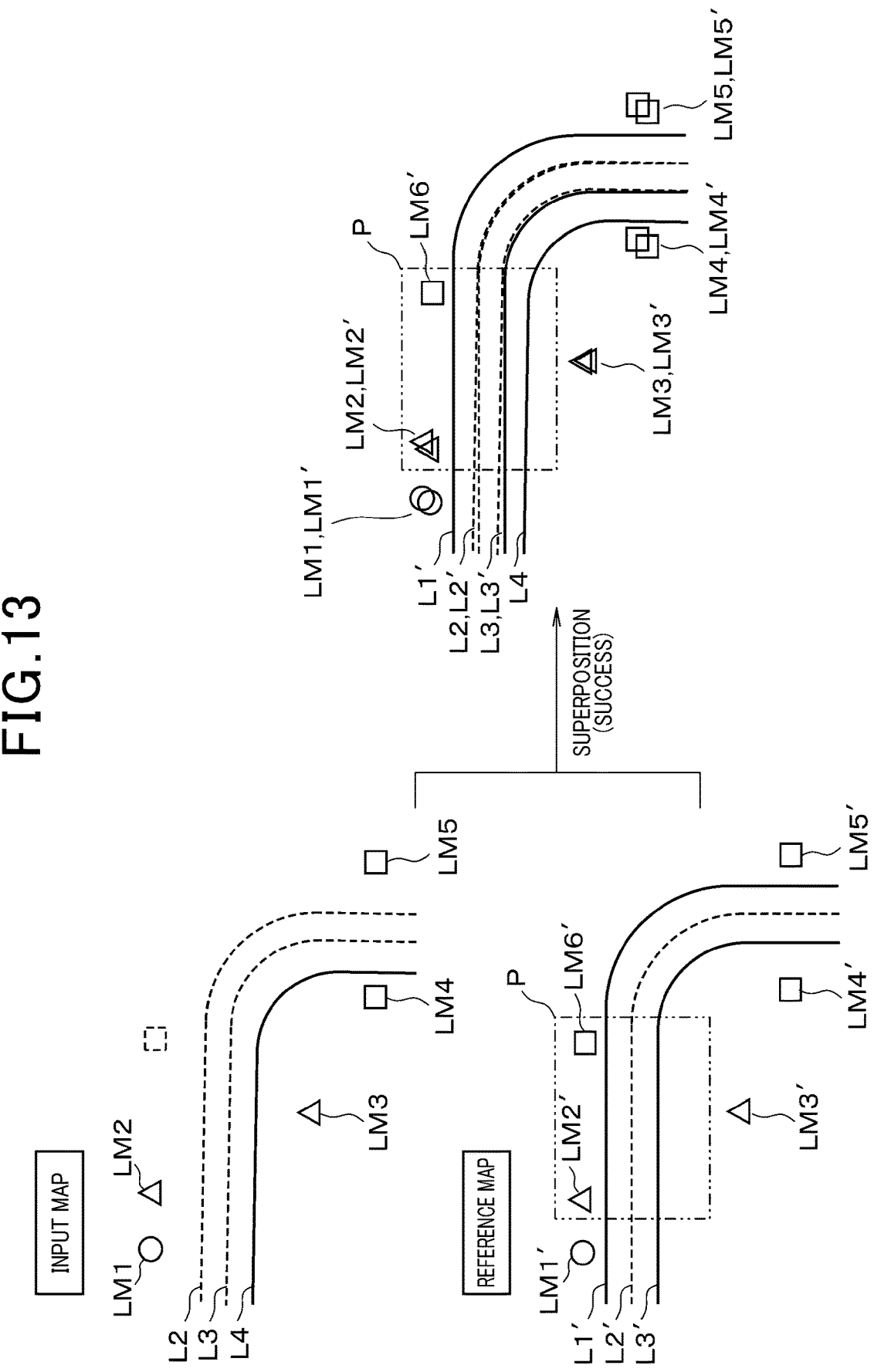
FIG. 13 is a diagram illustrating a mode of performing position correction for an input map.

As illustrated in FIG. 13, for example, the position correction section 10b superimposes the input map including landmarks 1 to 5 and lane markings L2 to L4 and the reference map including landmarks 1' to 6' and lane markings L1' to L3' on each other based on the landmarks to perform position correction for the input map. In this case, the position correction section 10b superimposes the input map and the reference map on each other so that the landmarks 1 to 5 included in the input map and the landmarks 1' to 5' included in the reference map are superimpose on each other.

Figure 14:
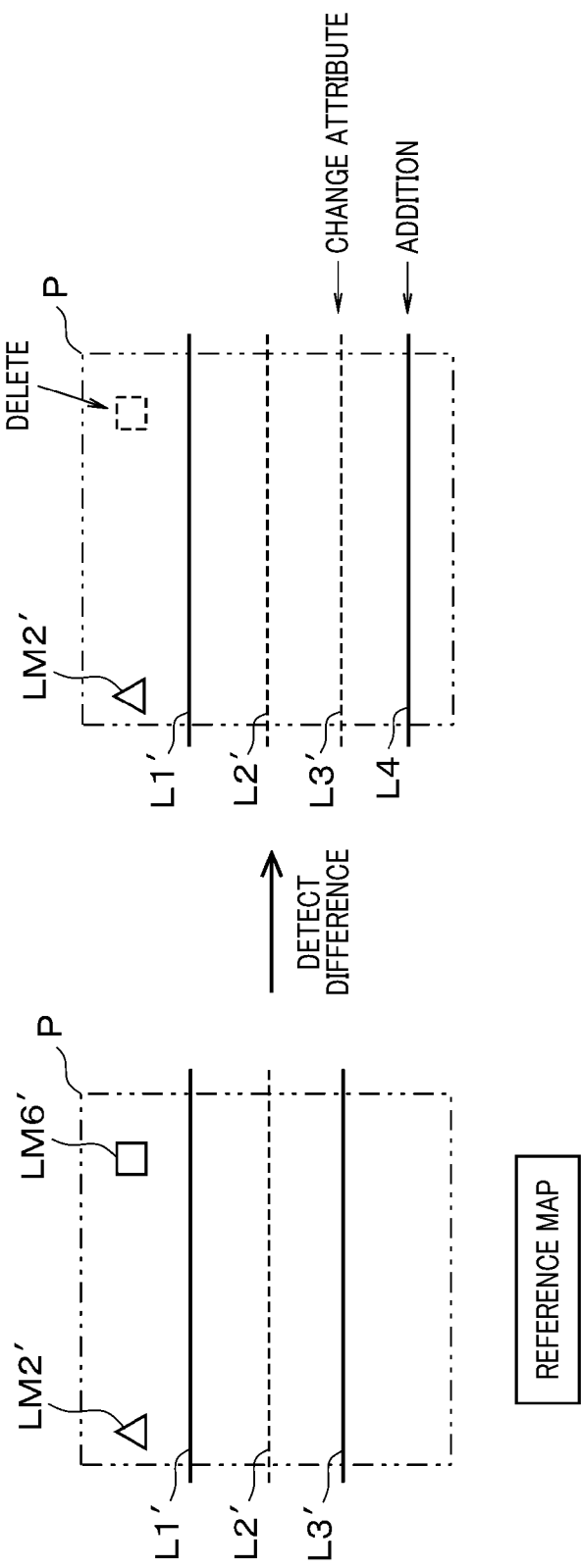
FIG. 14 is a diagram illustrating a mode of detecting a difference.

If determining that positions of at least four landmarks agree with each other between the input map and the reference map, and the position correction for the input map by the position correction section 10b succeeds, the difference detection section 10c detects differences between the input map and the reference map. That is, if the landmarks 1 to 5 included in the input map and the landmarks 1' to 5' included in the reference map are superimpose on each other, the difference detection section 10c determines that the lane markings L2 and L3 included in the input map and the lane markings L2' and L3' included in the reference map are associated with each other. As illustrated in FIG. 14, the difference detection section 10c detects, as the differences, the landmark 6' not included in the input map but included in the reference map, the attribute of the lane marking L3' included in the reference map, and the lane marking L4 included in the input map but not included in the reference map.

Figure 15:
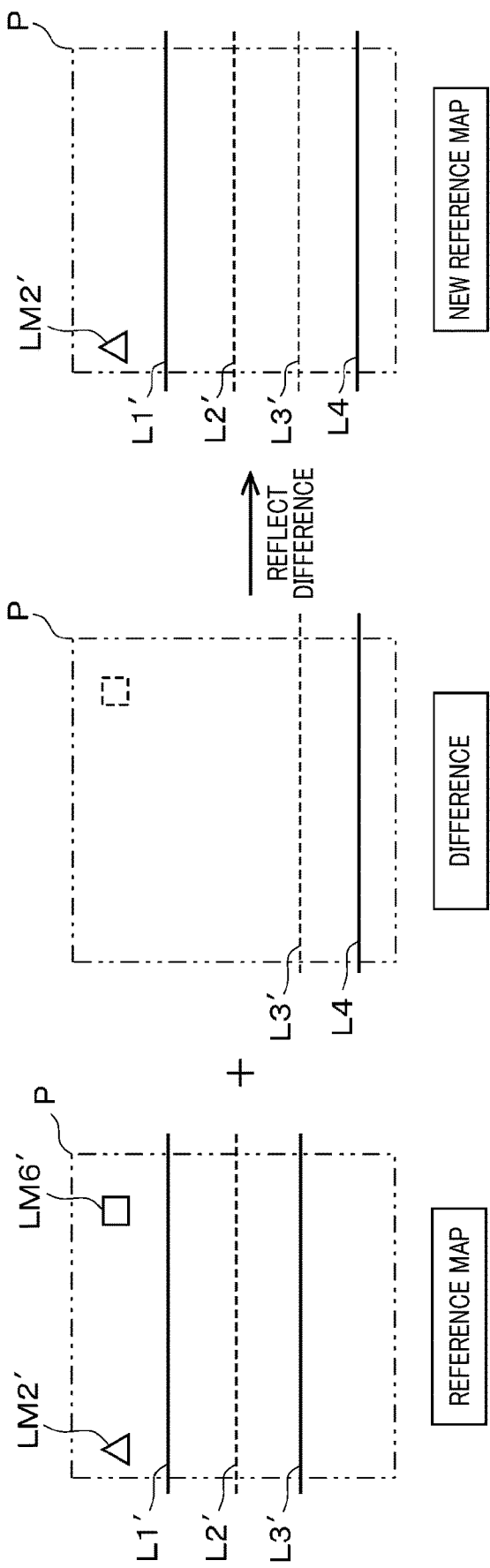
FIG. 15 is a diagram illustrating a mode of reflecting the difference in a reference map.

When the differences between the input map and the reference map are detected by the difference detection section 10c, the difference reflection section 10d reflects the detected differences in the reference map to update the reference map. That is, as illustrated in FIG. 15, in the reference map, the difference reflection section 10d deletes the landmark 6, changes the attribute of the lane marking L3', and adds the lane marking L4 to update the reference map, thereby generating a new reference map. In the new reference map, the landmark 6' is deleted, the attribute of the lane marking L3' is changed, and the lane marking L3' is added with respect to the reference map immediately before superimposition on the input map.

Figure 16:
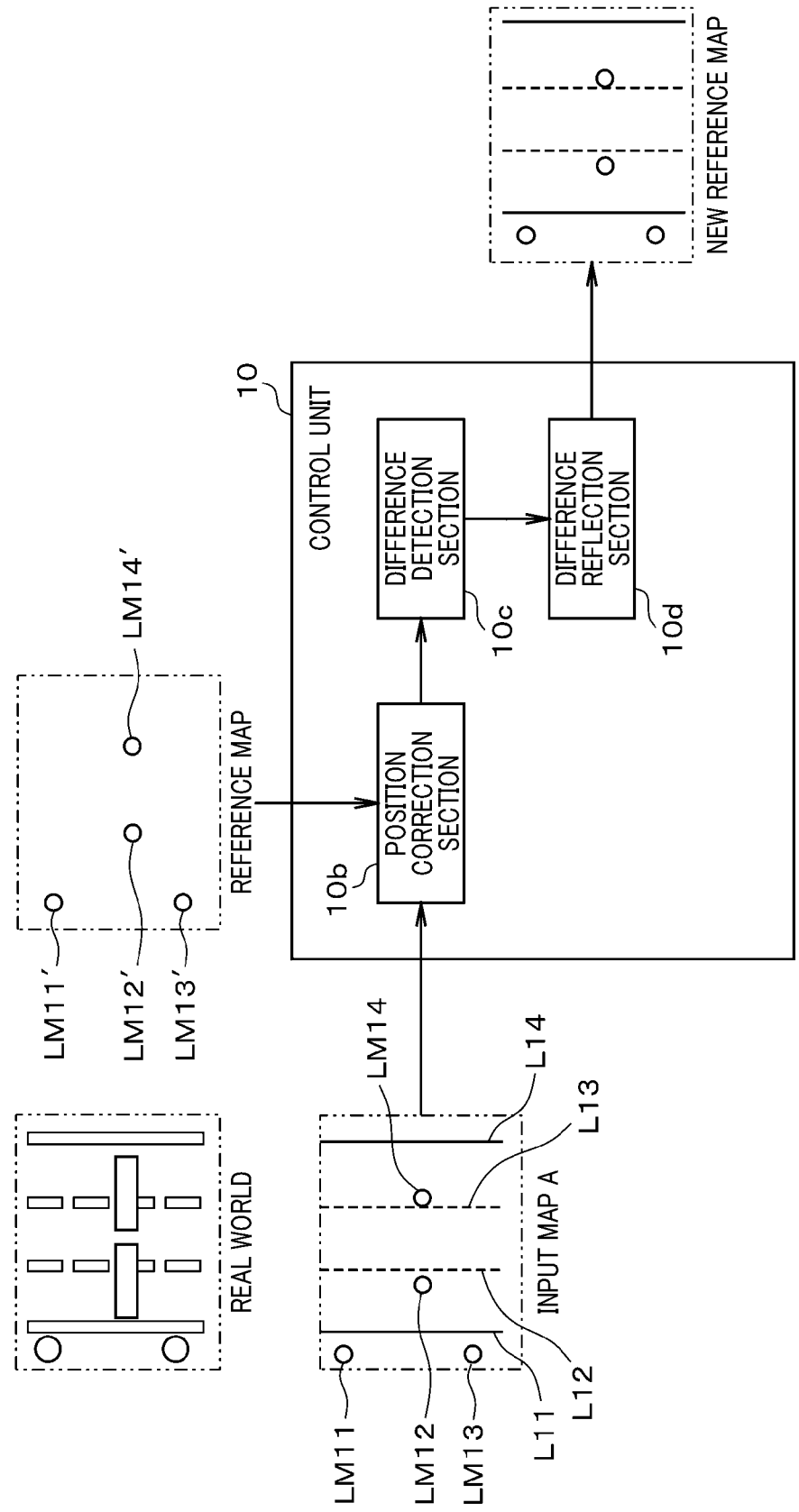
FIG. 16 is a diagram illustrating a flow of processing when position correction for an input map succeeds.

That is, when the input map and the reference map are superimposed on each other, if a landmark having sufficient amount of information is included in the reference map, the control unit 10 succeeds in position correction for the input map, detects differences between the input map and the reference map, and reflects the detected differences in the reference map, thereby updating the reference map. Specifically, as illustrated in FIG. 16, when an input map A including landmarks 11 to 14 and lane markings L11 to L14 and the reference map are superimposed on each other, if landmarks 11' to 14' having sufficient amount of information are included in the reference map, the control unit 10 succeeds in position correction for input map A, detects differences between the input map A and the reference map, and reflects the detected differences in the reference map, thereby updating the reference map.

In this case, the control unit 10 reflects, as the differences, static information and dynamic information in the reference map. The static information is landmark information on landmarks, lane marking information on landmarks, position information on points, and the like. The landmark information includes position coordinates indicating positions of the landmarks, IDs identifying the landmarks, sizes of the landmarks, shapes of the landmarks, colors of the landmarks, types of the landmarks, and the like. The lane marking information includes position coordinates indicating positions of the lane markings, IDs identifying the lane markings, types of broken lines and solid lines, and the like. The position information on points includes GPS coordinates indicating points of a road. The dynamic information is vehicle information regarding vehicles on the road, for example, vehicle speed, direction indicator operation information, lane crossing, a rudder angle, a yaw rate, and GPS coordinates.

When the differences are reflected by the difference reflection section 10d as described above to update the reference map, the reference map output section 10j outputs the updated reference map. As a mode outputting the reference map, for example, the reference map output section 10j causes the data communication unit 11 to deliver the reference map to the vehicle side or another server so as to be used as a map for an in-vehicle navigation device or another application. If the reference map is updated, the reference map output section 10j may output the updated reference map immediately after the update, or may temporarily store the updated reference map to output the updated reference map at the timing when an output request is issued or at periodical timing.

In contrast, when the input map and the reference map are superimposed on each other, if no landmark is included in the reference map, or a landmark having insufficient amount of information is included in the reference map, the control unit 10 fails in position correction for the input map. Hereinafter, a case in which position correction for the input map has failed will be described with reference to FIG. 17 to FIG. 25.

On failing in position correction for the input map by position correction section 10b, the feature point position estimation section 10e estimates positions of landmarks in a plurality of respective input maps. If the positions of the landmarks in the plurality of respective input maps are estimated by the feature point position estimation section 10e, the accumulated data generation section 10f accumulates the estimated positions of the landmarks to generate accumulated data and causes the accumulated data storage section 12d to store the generated accumulated data.

Figure 17:
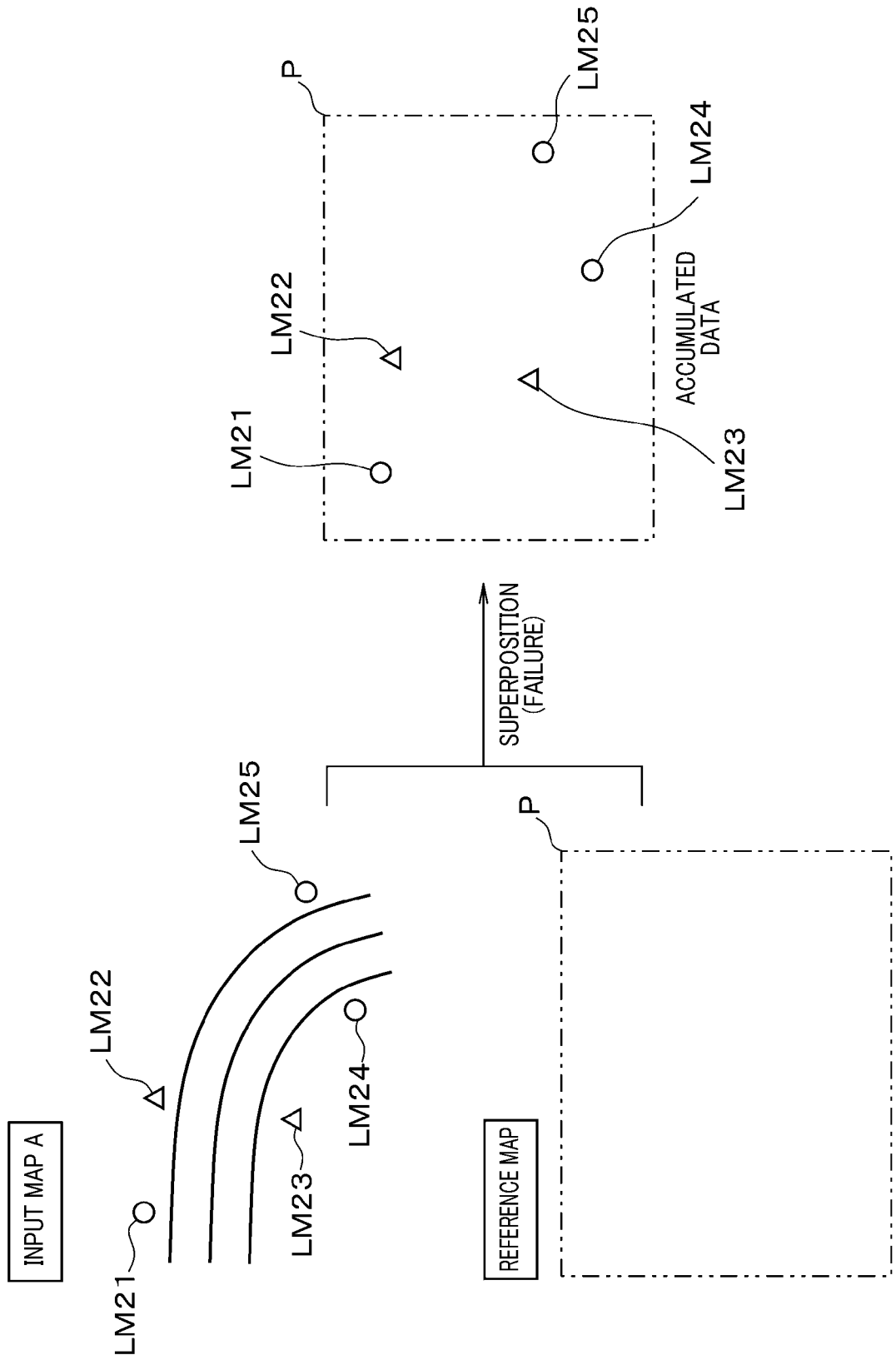
FIG. 17 is a diagram illustrating a mode of generating accumulated data (Part 1)

That is, as illustrated in FIG. 17, for example, when the input map A and the reference map are superimposed on each other, if no landmark is included in the reference map, position correction for the input map by the position correction section 10b fails. Hence, the feature point position estimation section 10e estimates positions of landmarks 21 to 25 included in the input map A. If positions of the landmarks 21 to 25 included in the input map A are estimated by the feature point position estimation section 10e, the accumulated data generation section 10f generates accumulated data from the estimated positions of the landmarks 21 to 25 and causes the accumulated data storage section 12d to store the generated accumulated data.

Figure 18:
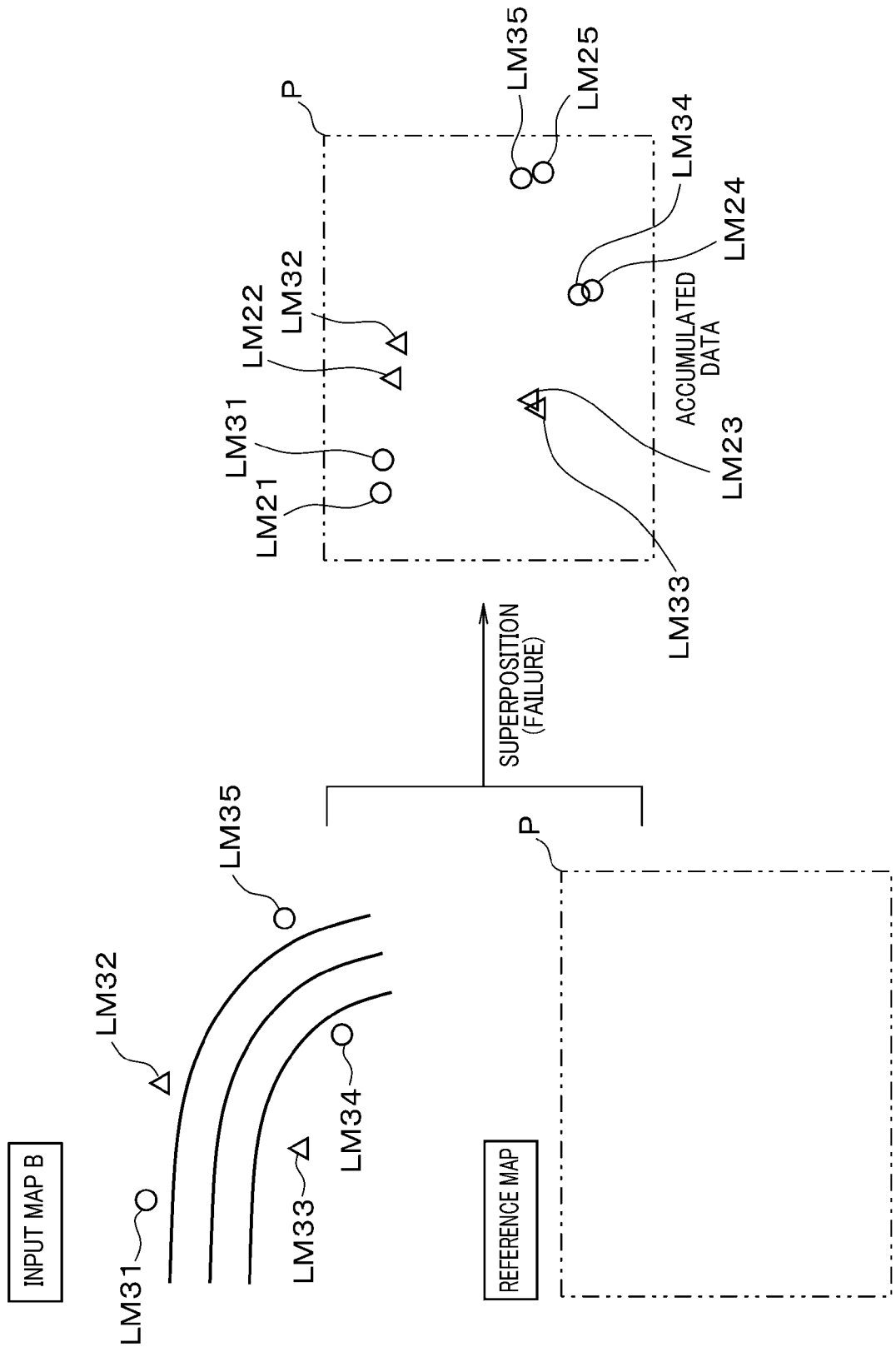
FIG. 18 is a diagram illustrating a mode of generating accumulated data (Part 2)
Figure 19:
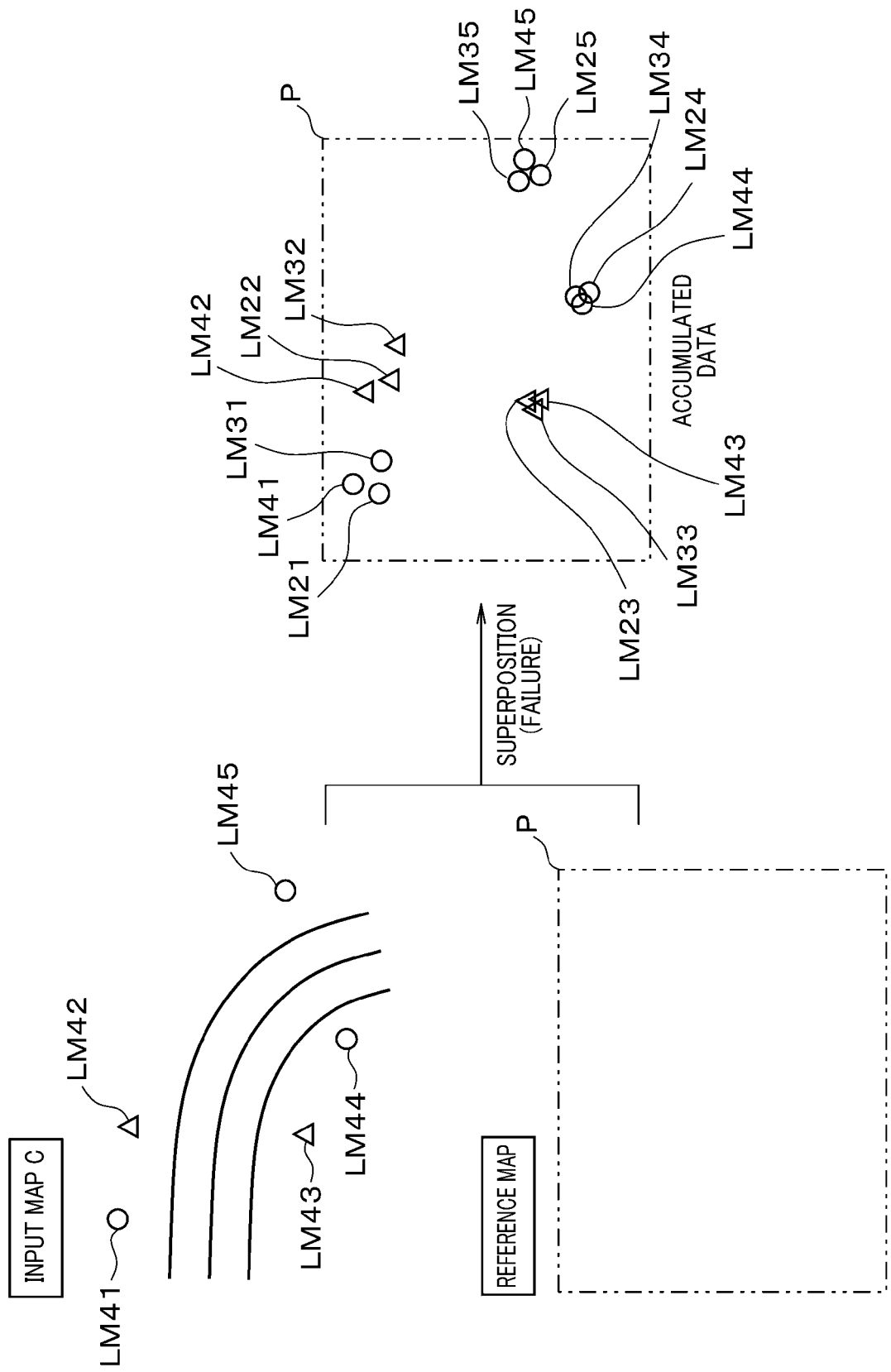
FIG. 19 is a diagram illustrating a mode of generating accumulated data (Part 3)

Thereafter, as illustrated in FIG. 18, the accumulated data generation section 10f performs a similar process also for input map B to generate accumulated data from positions of landmarks 31 to 35 included in the input map B. In this case, the accumulated data generation section 10f adds the landmarks 31 to 35 to the accumulated data including the landmarks 21 to 25 to generate accumulated data. Furthermore, as illustrated in FIG. 19, the accumulated data generation section 10f performs a similar process also for input map C to generate accumulated data from positions of landmarks 41 to 45 included in the input map C. In this case, the accumulated data generation section 10*f* adds landmarks 41 to 45 to the accumulated data including the landmarks 21 to 25 and 31 to 35 to generate accumulated data. The input map A, the input map B, and the input map C differ, for example, in a time series and are generated at regular time periods such as a time unit or a day unit. Although a case in which accumulated data is generated for three input maps has been illustrated, the number of input maps for which accumulated data is generated may be four or more.

Figure 20:
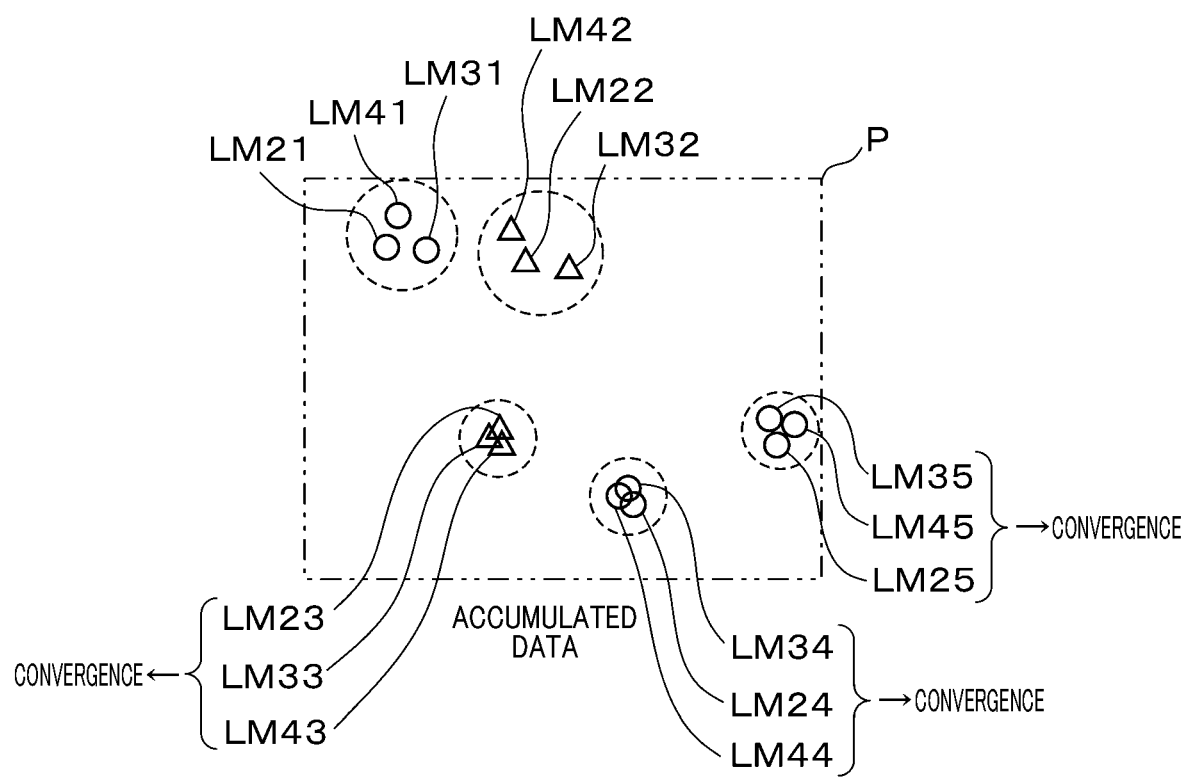
FIG. 20 is a diagram illustrating a mode of determining whether a position of a landmark has converged.

The convergence determination section 10*g* reads the accumulated data stored in the accumulated data storage section 12*d* to determine whether the positions of the landmarks have converged based on the read accumulated data. That is, the convergence determination section 10*g* determines a degree of dispersion of common landmarks. Then, for example, if any one of the common landmarks is located outside an area having a predetermined radius, the convergence determination section 10*g* determines that the degree of dispersion has not decreased to a predetermined level, thereby determining that the positions of the landmarks have not converged. In contrast, for example, if all of the common landmarks are located inside the area having the predetermined radius, the convergence determination section 10*g* determines that the degree of dispersion has decreased to the predetermined level, thereby determining that the positions of the landmarks have converged. As illustrated in FIG. 20, for example, the convergence determination section 10*g* determines that, for a group of the landmarks 21, 31, and 41 and a group of the landmarks 22, 32, and 42, the degree of dispersion has not reached the predetermined level, thereby determining that the positions of the landmarks have not converged. In contrast, for example, the convergence determination section 10*g* determines that, for a group of the landmarks 23, 33, and 43, a group of the landmarks 24, 34, and 44, and a group of the landmarks 25, 35, and 45, the degree of dispersion has reached the predetermined level, thereby determining that the positions of the landmarks have converged.

Figure 21:
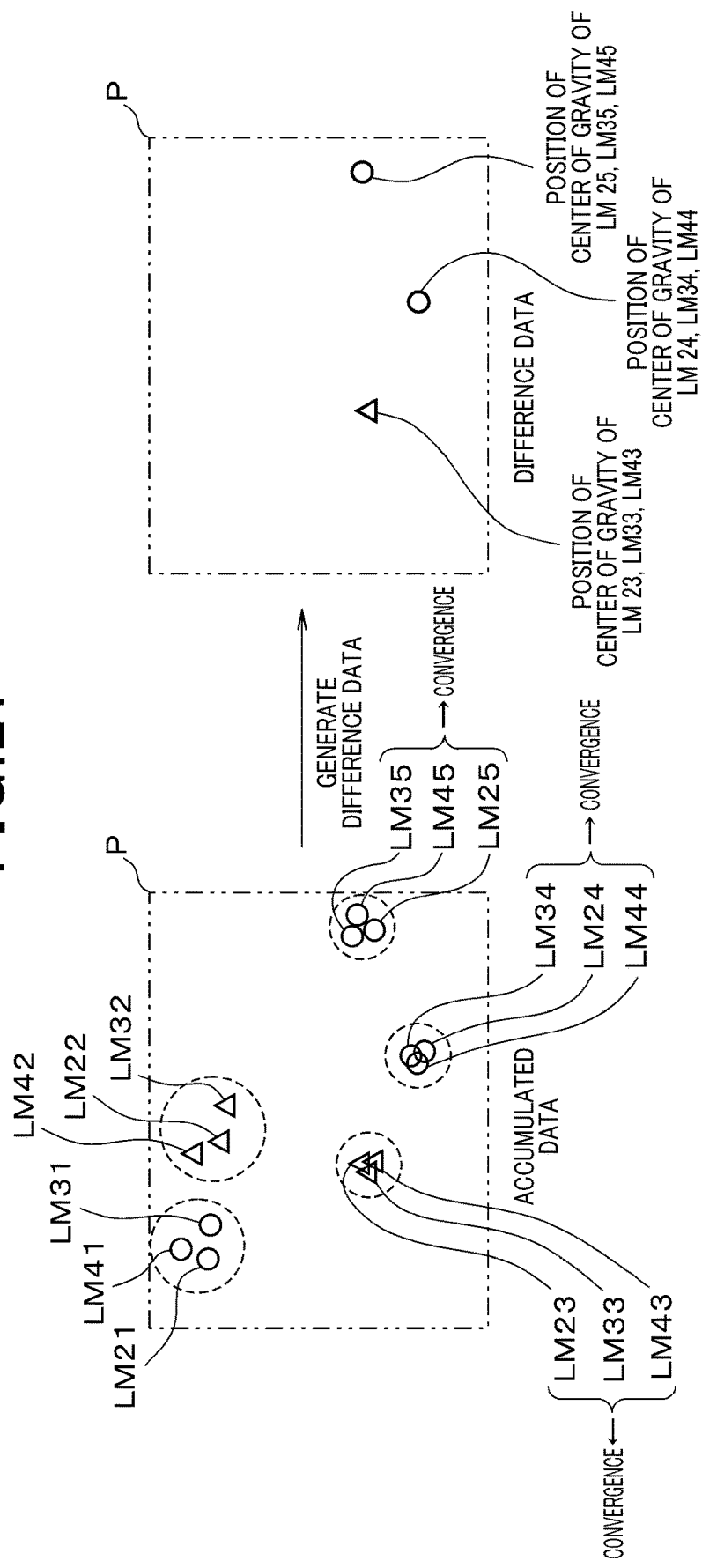
FIG. 21 is a diagram illustrating a mode of generating difference data.

When the convergence determination section 10*g* determines that the positions of the landmarks have converged, the difference data generation section 10*h* generates difference data from the positions of the landmarks that have converged. That is, as illustrated in FIG. 21, the convergence determination section 10*g* calculates, for example, respective centers of gravity of the group of the landmarks 23, 33, and 43, the group of the landmarks 24, 34, and 44, and the group of the landmarks 25, 35, and 45, for which it is determined that the positions of the landmarks have converged, to generate difference data from the calculated centers of gravity.

Figure 22:
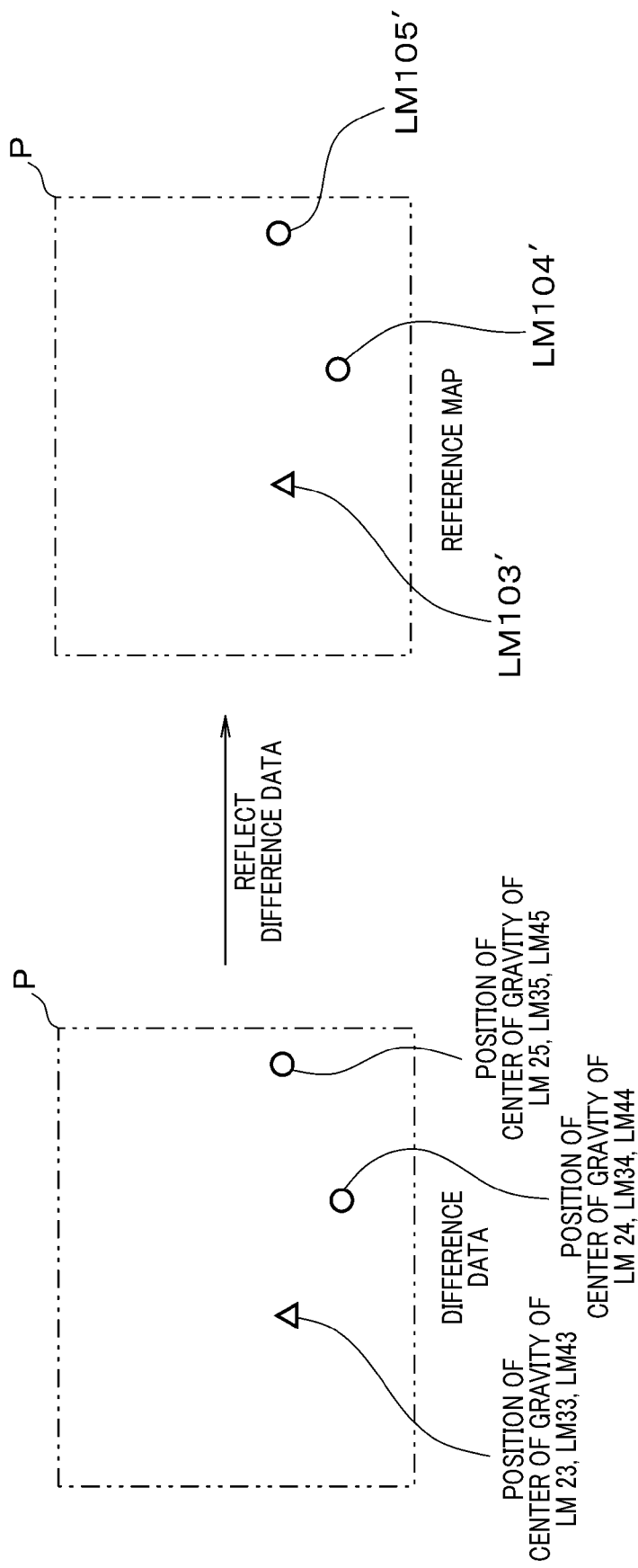
FIG. 22 is a diagram illustrating a mode of reflecting the difference in the reference map.

When the difference data is generated by the difference data generation section 10*h*, the difference data reflection section 10*i* reflects the generated difference data in the reference map to update the reference map. That is, as illustrated in FIG. 22, the difference data reflection section 10*i* reflects the respective centers of gravity of the group of the landmarks 23, 33, and 43, the group of the landmarks 24, 34, and 44, and the group of the landmarks 25, 35, and 45 in the reference map as landmarks 103', 104, and 105' to update the reference map to generate a new reference map. In the new reference map, the landmarks 103', 104, and 105' are added with respect to the reference map immediately before superimposition on the input map.

That is, when the input map and the reference map are superimposed on each other, if no landmark is included in the reference map, or a landmark having insufficient amount of information is included in the reference map, the control unit 10 fails in position correction for the input map and accumulates landmarks of a plurality of input maps to generate accumulated data. Then, when the positions of the landmarks converge based on the generated accumulated data, the control unit 10 generates difference data from the positions of the landmarks that have converged, and reflects the generated difference data in the reference map, thereby updating the reference map.

Figure 23:
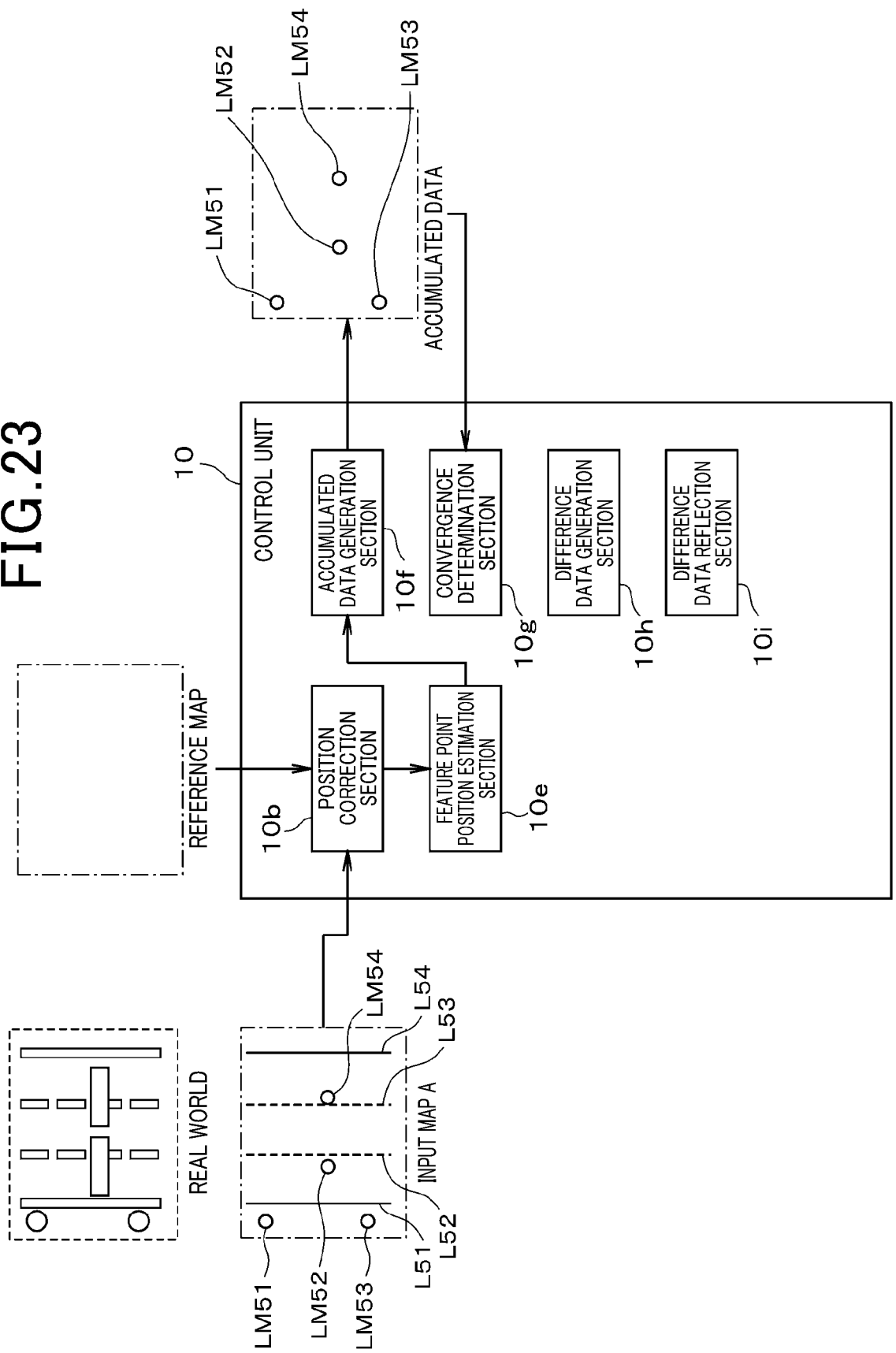
FIG. 23 is a diagram illustrating a flow of processing when position correction for an input map fails (Part 1)
Figure 24:
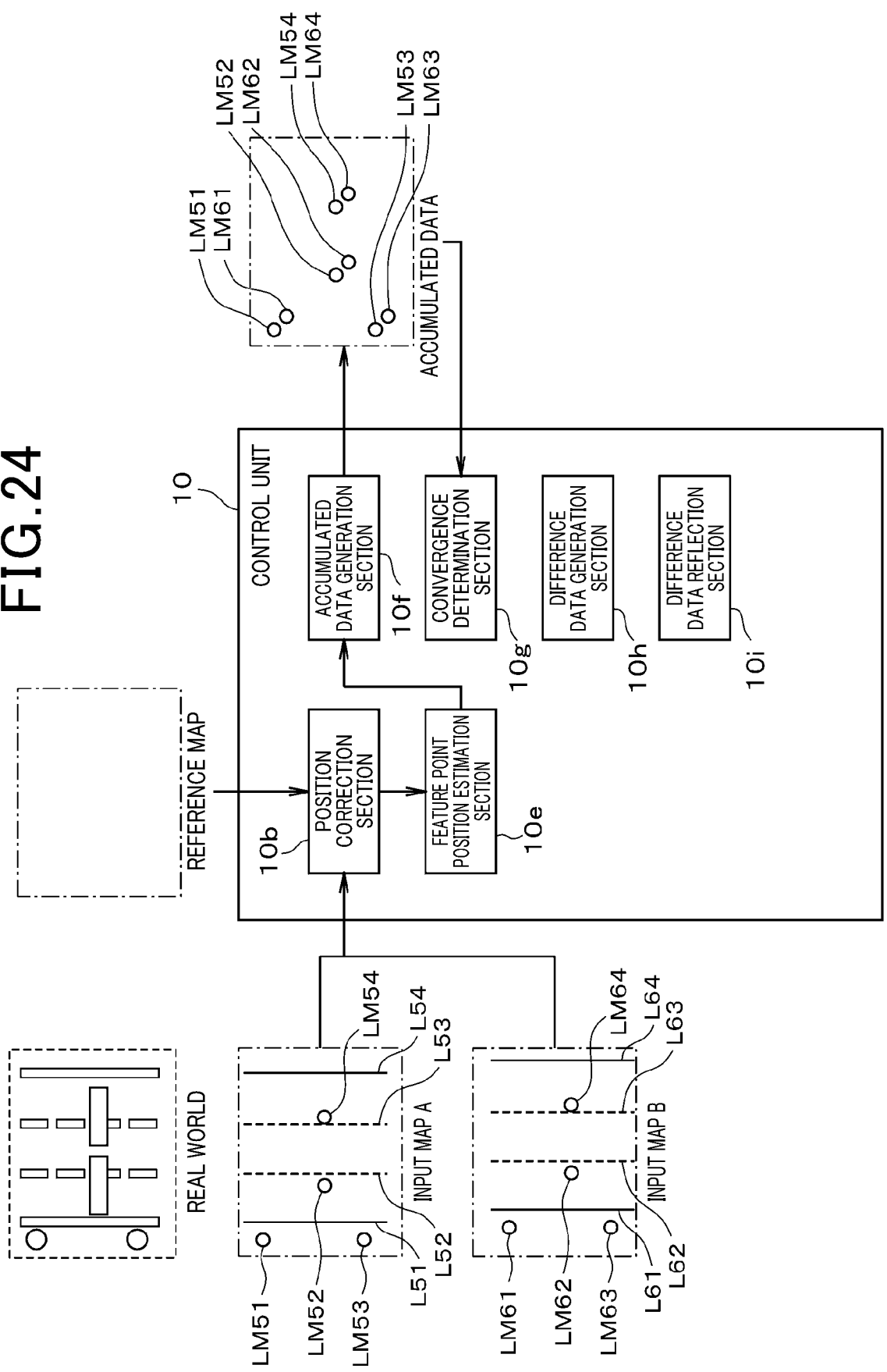
FIG. 24 is a diagram illustrating a flow of processing when position correction for an input map fails (Part 2)
Figure 25:
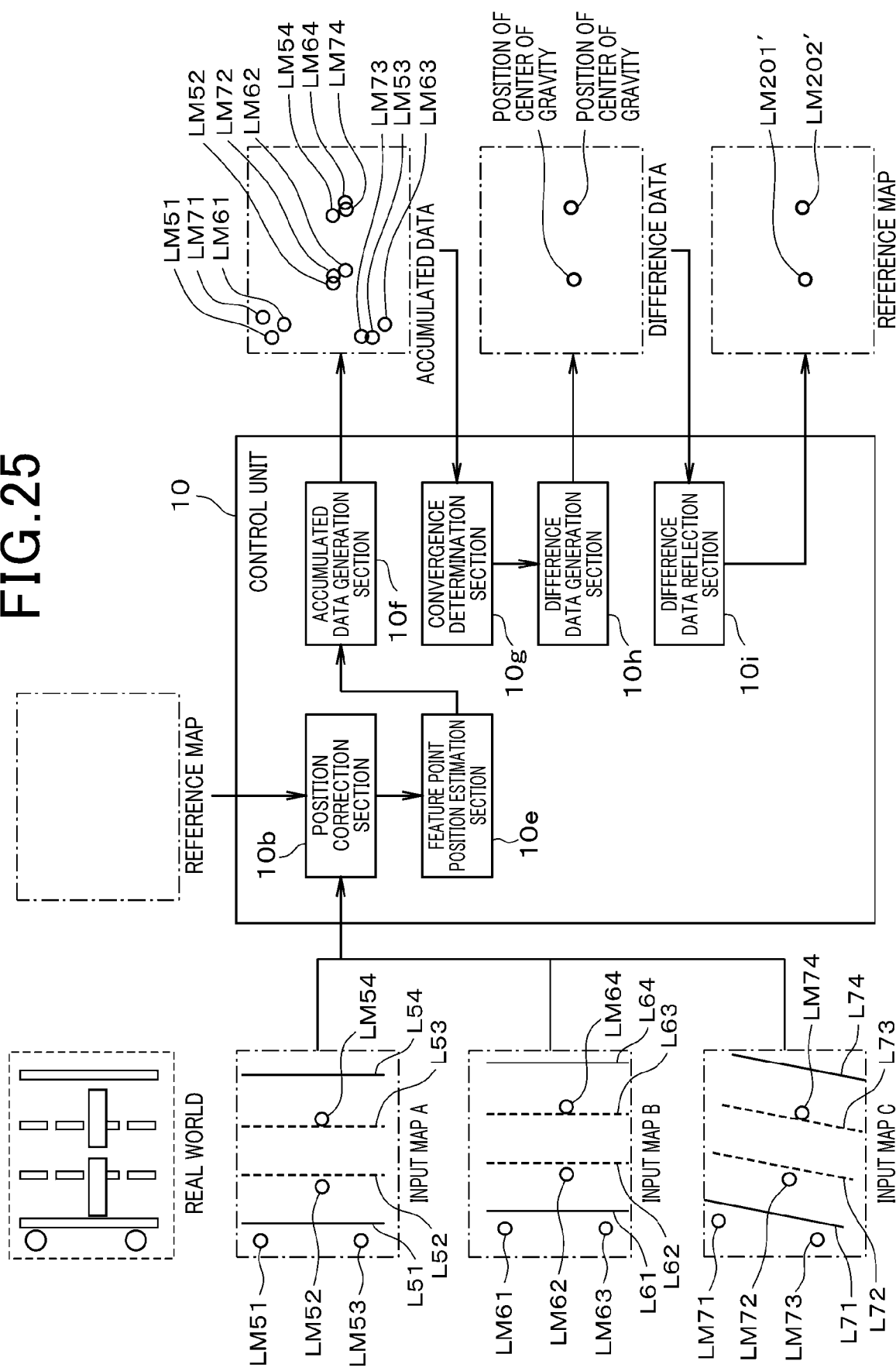
FIG. 25 is a diagram illustrating a flow of processing when position correction for an input map fails (Part 3)

Specifically, as illustrated in FIG. 23, when the input map A including landmarks 51 to 54 and lane markings L51 to L54 and the reference map are superimposed on each other, if no landmark is included in the reference map, or a landmark having insufficient amount of information is included in the reference map, the control unit 10 fails in position correction for the input map and generates accumulated data including the landmarks 51 to 54. Next, as illustrated in FIG. 24, when the input map B including landmarks 61 to 64 and lane markings L61 to L64 and the reference map are superimposed on each other, if no landmark is included in the reference map, or a landmark having insufficient amount of information is included in the reference map, the control unit 10 fails in position correction for the input map and generates accumulated data. Next, as illustrated in FIG. 25, when the input map C including landmarks 71 to 74 and lane markings L71 to L74 and the reference map are superimposed on each other, if no landmark is included in the reference map, or a landmark having insufficient amount of information is included in the reference map, the control unit 10 fails in position correction for the input map and generates accumulated data.

When the positions of the landmarks have converged based on the accumulated data, the control unit 10 generates difference data from the positions of the landmarks that have converged and reflects the generated difference data in the reference map to update the reference map. Specifically, for example, if determining that, for a group of the landmarks 52, 62, 72 and a group of the landmarks 54, 64, 74, the positions of the landmarks have converged, the control unit 10 calculates respective centers of gravity of the group of the landmarks 52, 62, 72 and the group of the landmarks 54, 64, 74 to generate difference data and reflects landmarks 201' and 202', which are the respective centers of gravity, in the reference map to update the reference map, thereby generating a new reference map. In the new reference map, for example, the landmarks 201' and 202', which are the respective centers of gravity of the group of the landmarks 52, 62, 72 and the group of the landmarks 54, 64, 74, are added with respect to the reference map immediately before superimposition on the input map A. Thereafter, since the control unit 10 performs position correction for the input map by using the reference map in which the difference data is reflected by adding the landmarks 201' and 202' as described above, the possibility of success in position correction for the input map increases.

Figure 26:
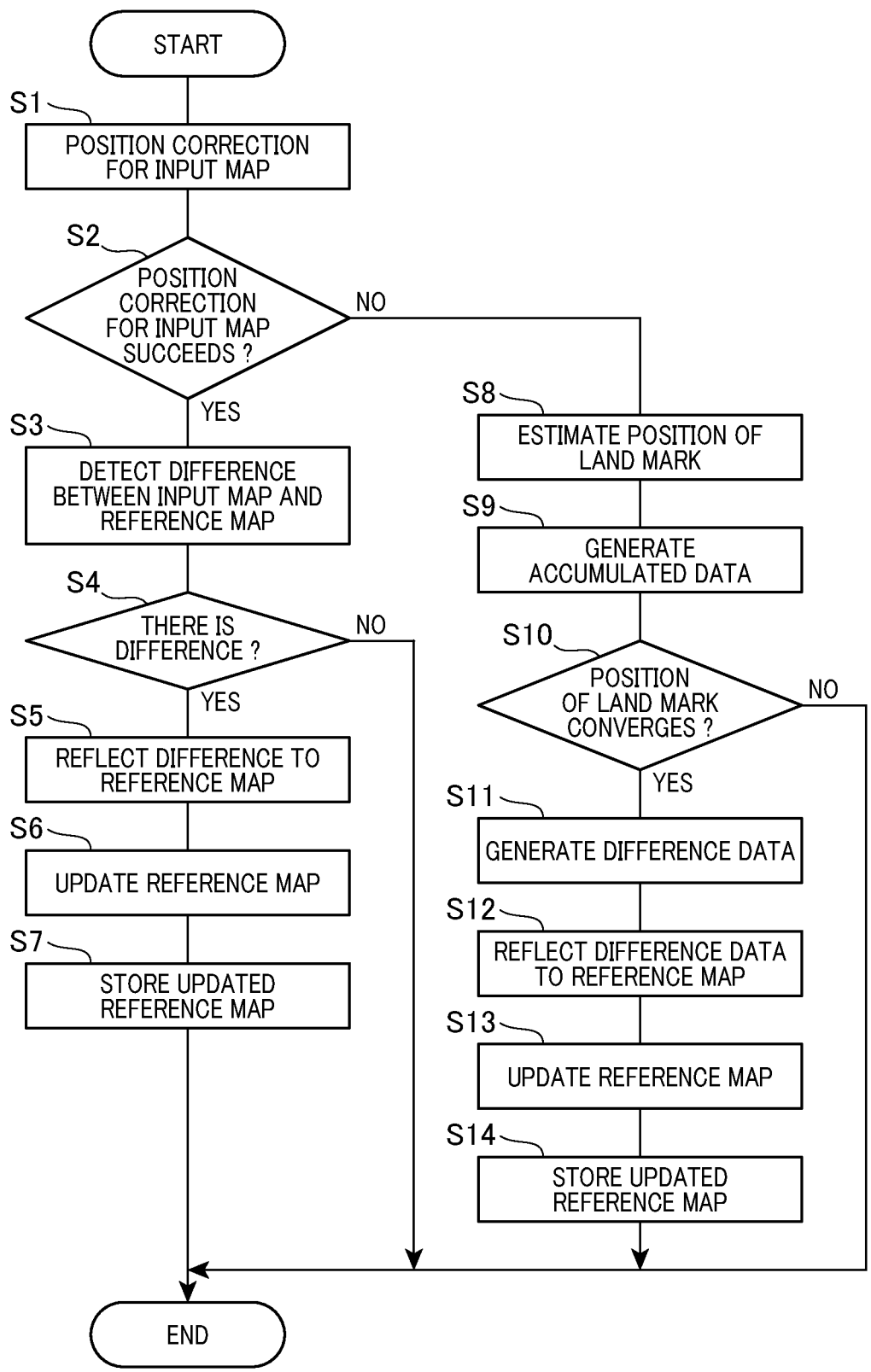
FIG. 26 is a flowchart.

Next, operation of the configuration described above will be described with reference to FIG. 26.

In the server 3, on starting a map update process, the control unit 10 reads an input map stored in the input map storage section 12*b*, reads a reference map stored in the reference map storage section 12*c*, and superimposes the read input map and reference map on each other based on a landmark to perform position correction for the input map (51). The control unit 10 determines whether the position correction for the input map has succeeded (S2). If determining that the position correction for the input map has succeeded (S2: YES), the control unit 10 detects a difference between the input map and the reference map (S3). The control unit 10 determines whether there is a difference between the input map and the reference map (S4). If determining that there is a difference (S4: YES), the control unit 10 reflects the detected difference in the reference map (S5) to update the reference map (S6). The control unit 10 stores the updated reference map in the reference map storage section 12c (S7), and completes the map update process.

In contrast, if determining that the position correction for the input map has failed (S2: NO), the control unit 10 estimates positions of landmarks for each of the plurality of input maps (S8, corresponding to a feature point position estimation step) and accumulates the estimated landmarks to generate accumulated data (S9, corresponding to an accumulated data generation step). The control unit 10 determines whether the positions of the landmarks have converged based on the generated accumulated data (S10, corresponding to a convergence determination step). If determining that the positions of the landmarks have converged (S10: YES), the control unit 10 generates difference data from the positions of the landmarks that have converged (S11, corresponding to a difference data generation step). The control unit 10 reflects the generated difference data in the reference map (S12, corresponding to a difference data reflection step) to update the reference map (S13). The control unit 10 stores the updated reference map in the reference map storage section 12c, and completes the map update process.

According to the embodiment described above, the following effects can be provided.

In the server 3, if position correction for an input map fails, positions of landmarks for each of the plurality of input maps are estimated, the landmarks estimated for each of the plurality of input maps are accumulated to generate accumulated data, and it is determined whether the positions of the landmarks have converged based on the generated accumulated data. If determining that the positions of the landmarks have converged, difference data is generated from the positions of the landmarks that have converged, and the generated difference data is reflected in the reference map to update the reference map.

That is, if position correction for the input map fails, since the difference data indicating the positions of the landmarks is reflected in the reference map to update the reference map, position correction for the input map is performed thereafter by using the reference map in which the difference data is reflected, whereby the possibility of success in the position correction for the input map can be increased. Thus, the difference between the input map and the reference map is appropriately detected, and the detected difference is reflected in the reference map, whereby the reference map can be appropriately updated.

In the server 3, an input map is generated based on a plurality of probe data, and the generated input map and the reference map are superimposed on each other to perform position correction for the input map. Using the input map based on a plurality of probe data can increase accuracy in detecting a difference between the input map and the reference map when the position correction for the input map has succeeded.

In the server 3, as the differences between the input map and the reference map, static information is reflected to the reference map to update the reference map. As the static information, for example, and mark information, lane marking information, and position information on points are reflected in the reference map, whereby the reference map can be updated. In the present embodiment, a case is illustrated in which accumulated data regarding landmarks is held, and the accumulated data is used for updating the differences when the positions of the landmarks have converged. However, accumulated data regarding lane markings may be held, and the accumulated data may be used for updating the differences when the positions of the positions of lane markings have converged. The landmarks and the lane markings may be used together.

In the server 3, as the differences between the input map and the reference map, dynamic information is reflected in the reference map to update the reference map. As the dynamic information, for example, vehicle information may be reflected in the reference map to update the reference map.

Although the present disclosure is described with reference to the examples, it is understood that the present disclosure is not to be considered limited to the examples, the structures, or the like. The present disclosure encompasses even various modification examples and modifications in the equivalent scope. In addition, various combinations and forms, and furthermore, other combinations and forms including only one element or more or less besides the various combinations and forms are considered to fall within the idea of the present disclosure.

Although an example in which an input map generated based on a plurality of probe data is superimposed on a reference map has been illustrated, an input map generated based on one probe data may be superimposed on the reference map.

A configuration has been illustrated in which, in the server 3, a segment not including a predetermined number or more of landmarks and a segment not including a predetermined number or more of landmarks whose detection level is a predetermined level or more are not acquired. However, in the in-vehicle devices 2, conditions for transmitting probe data including segments to the server 3 may be set. That is, a configuration has been illustrated in which, in the in-vehicle devices 2, probe data is transmitted to the server 3, for example, every time a predetermined time period elapses or every time a travel distance of the vehicle reaches a predetermined distance. However, a configuration may be provided in which the number of detected landmarks included in a segment is determined, and probe data is transmitted to the server 3 only when the number of detected landmarks is a predetermined number or more. That is, since the number of detected landmarks may not be the predetermined number or more due to presence of a preceding vehicle or the like, a configuration may be provided in which when it is assumed that, if probe data including a segment in which the number of detected landmarks is not the predetermined number or more is transmitted to the server 3, the probe data is not processed by the server 3 and is discarded, the probe data is not transmitted to the server 3. Since probe data unnecessary for the server 3 is not transmitted from the in-vehicle device 2, the load of data communication can be reduced.

The components such as the control unit in the present disclosure and the methods executed by the control unit may be implemented by a dedicated computer including a processor or a memory programmed to execute one or more functions embodied by computer programs. The components such as the control unit in the present disclosure and the methods executed by the control unit may be implemented by a dedicated computer including a processor formed of one or more dedicated hardware logical circuits. The components such as the control unit in the present disclosure and the methods executed by the control unit may be implemented by one or more dedicated computers including a combination of a processor and a memory programmed to execute one or more functions and a processor including one or more hardware logical circuits. The computer programs may be stored, as instructions to be executed by a computer, in a computer-readable non-transient tangible recording medium.

As an aspect of the present disclosure, an input map generation section (10a) generates an input map including a landmark and a lane marking based on a plurality of probe data including image data acquired from an in-vehicle camera and data acquired from at least one of an in-vehicle sensor and in-vehicle equipment. A position correction section (10b) superimposes an input map and a reference map on each other based on a feature point to perform position correction for the input map. A difference detection section (10c) detects a difference between the input map and the reference map if the position correction section has succeeded in the position correction for the input map. When the difference between the input map and the reference map is detected, a difference reflection section (10d) reflects the detected difference in the reference map to update the reference map.

A feature point position estimation section (10e) estimates positions of feature points of a plurality of respective input maps if the position correction section has failed in the position correction for the input map. When the positions of the feature points of the plurality of respective input maps are estimated, an accumulated data generation section (10f) accumulates the estimated positions of the feature points of the plurality of respective input maps to generate accumulated data. When the accumulated data is generated, a convergence determination section (10g) determines whether the positions of the feature points have converged based on the generated accumulated data. If it is determined that the positions of the feature points have converged, a difference data generation section (10h) generates difference data from the positions of the feature points that have converged. When the difference data is generated, a difference data reflection section (10i) reflects the generated difference data in the reference map to update the reference map.

If the position correction for the input map succeeds, differences between the input map and the reference map are detected, and the detected differences are reflected in the reference map to update the reference map. In contrast, if the position correction for the input map fails, positions of feature points of a plurality of respective input maps are estimated, the estimated positions of the feature points of the plurality of respective input maps are accumulated to generate accumulated data, and it is determined whether the positions of the feature points have converged based on the generated accumulated data. If it is determined that the positions of the feature points have converged, difference data is generated from the positions of the feature points that have converged, and the generated difference data is reflected in the reference map to update the reference map.

That is, if the position correction for the input map fails, the difference data indicating the positions of the feature points that have converged in a plurality of input maps is reflected in the reference map to update the reference map. Hence, thereafter, position correction for the input map is performed by using the reference map in which the difference data is reflected, whereby the possibility of success in the position correction for the input map can be increased. If the position correction for the input map succeeds, differences between the input map and the reference map are detected, and the detected differences are reflected in the reference to update the reference map. Thus, the difference between the input map and the reference map is appropriately detected, and the detected difference is reflected in the reference map, whereby the reference map can be appropriately updated.

What is claimed is:

1. A map update device comprising a storage medium and a processor, the processor executing instructions stored in the storage medium to:
    generate an input map including a landmark and a lane marking based on a plurality of probe data including at least one of image data acquired from an in-vehicle camera and data acquired from an in-vehicle sensor;
    superimpose the input map and a reference map on each other based on a feature point to perform position correction for the input map;
    detect a difference between the input map and the reference map when the processor has determined that the position correction for the input map has succeeded; and
    reflect the detected difference in the reference map to update the reference map;
    estimate positions of feature points of a plurality of respective input maps when the processor has determined that the position correction for the input map has failed;
    accumulate the estimated positions of the feature points of the plurality of respective input maps to generate accumulated data;
    determine whether the positions of the feature points have converged based on the accumulated data;
    generate, when the processor determines that the positions of the feature points have converged, difference data from the positions of the feature points that have converged; and
    reflect the generated difference data in the reference map to update the reference map.

2. The map update device according to claim 1, wherein the processor superimposes the generated input map and the reference map on each other based on the feature point to perform position correction for the input map.

3. The map update device according to claim 1, wherein the processor uses a single landmark, which includes one landmark, as the feature point to superimpose the input map and the reference map on each other based on the single landmark to perform position correction for the input map.

4. The map update device according to claim 1, wherein the processor uses, as the feature point, an integrated landmark formed by integrating a plurality of landmarks to superimpose the input map and the reference map on each other based on the integrated landmark to perform position correction for the input map.

5. The map update device according to claim 1, wherein the processor reflects, as the difference between the input map and the reference map, static information in the reference map to update the reference map.

6. The map update device according to claim 1, wherein the processor reflects, as the difference between the input map and the reference map, dynamic information in the reference map to update the reference map.

7. The map update device according to claim 1, wherein the processor further performs outputting of the reference map in which the difference is reflected and which is updated.

8. A computer-readable non-transitory storage medium that stores a map update program for causing a computer of a map update device to:
  generate an input map including a landmark and a lane marking based on a plurality of probe data including at least one of image data acquired from an in-vehicle camera and data acquired from an in-vehicle sensor;
  superimpose the input map and a reference map on each other based on a feature point to perform position correction for the input map;
  detect a difference between the input map and the reference map when determining that the position correction for the input map has succeeded;
  reflect the detected difference in the reference map to update the reference map;
  estimate positions of feature points of a plurality of respective input maps when determining that the position correction for the input map has failed;
  accumulate the estimated positions of the feature points of the plurality of respective input maps to generate accumulated data;
  determine whether the positions of the feature points have converged based on the accumulated data;
  generate, when determining that the positions of the feature points have converged, difference data from the positions of the feature points that have converged; and
  reflect the generated difference data in the reference map to update the reference map.

* * * * *